US012300261B1

(12) United States Patent
Liu et al.

(10) Patent No.: US 12,300,261 B1
(45) Date of Patent: May 13, 2025

(54) NEURAL SIDELOBE CANCELLER FOR TARGET SPEECH SEPARATION

(71) Applicant: Amazon Technologies, Inc., Seattle, WA (US)

(72) Inventors: Yuzhou Liu, Mountain View, CA (US); Ali Abdollahzadeh Milani, Mountain View, CA (US); Tarun Pruthi, Fremont, CA (US); Trausti Thor Kristjansson, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 17/708,618

(22) Filed: Mar. 30, 2022

Related U.S. Application Data

(60) Provisional application No. 63/309,895, filed on Feb. 14, 2022.

(51) Int. Cl.

| | |
|---|---|
| ***G10L 21/02*** | (2013.01) |
| ***G10K 11/175*** | (2006.01) |
| ***G10L 21/0232*** | (2013.01) |
| ***G10L 21/028*** | (2013.01) |
| ***G10L 25/30*** | (2013.01) |
| ***H04R 1/40*** | (2006.01) |
| ***H04R 3/00*** | (2006.01) |
| *G10L 21/0216* | (2013.01) |

(52) U.S. Cl.
CPC ........ *G10L 21/028* (2013.01); *G10K 11/1754* (2020.05); *G10L 21/0232* (2013.01); *G10L 25/30* (2013.01); *H04R 1/406* (2013.01); *H04R 3/005* (2013.01); *G10L 2021/02166* (2013.01); *H04R 2410/01* (2013.01)

(58) Field of Classification Search
CPC ................................ G10L 21/02; G10L 25/30
See application file for complete search history.

(56) References Cited

U.S. PATENT DOCUMENTS

2019/0172476 A1* 6/2019 Wung ................. G10L 21/0232
2022/0124444 A1* 4/2022 Andersen ............. H04R 25/507

OTHER PUBLICATIONS

Li, Guanjun, et al. "Deep neural network-based generalized sidelobe canceller for dual-channel far-field speech recognition." Neural Networks 141 (2021): 225-237. (Year: 2021).*

(Continued)

*Primary Examiner* — Jialong He
(74) *Attorney, Agent, or Firm* — Pierce Atwood LLP

(57) ABSTRACT

A system configured to perform neural sidelobe cancelling to achieve enhanced target speech separation. A device improves target speech separation by combining a fixed directional beamformer with a deep neural network (DNN) configured to (i) selectively enhance speech in one target direction, (ii) cancel speech from non-target directions, and (iii) cancel non-speech interference from all directions. By combining the directional output from the beamformer with raw microphone signals as input signals to the DNN, the DNN is given a directional cue with which to select the target speech. The DNN generates mask data representing the target speech using a combination of temporal convolutional blocks and causal self-attention blocks. For example, the DNN achieves low latency by processing a large number of short frames, while the causal self-attention blocks smooth the output and reinforce local consistency of speech.

20 Claims, 21 Drawing Sheets

(56) References Cited

OTHER PUBLICATIONS

Liu, Yuzhou, and DeLiang Wang. "Causal deep CASA for monaural talker-independent speaker separation." IEEE/ACM transactions on audio, speech, and language processing 28 (2020): 2109-2118. (Year: 2020).*

Zhao, Yan, et al. "Monaural speech dereverberation using temporal convolutional networks with self attention." IEEE/ACM transactions on audio, speech, and language processing 28 (2020): 1598-1607. (Year: 2020).*

Shi, Ziqiang, et al. "Deep Attention Gated Dilated Temporal Convolutional Networks with Intra-Parallel Convolutional Modules for End-to-End Monaural Speech Separation." Interspeech. 2019. (Year: 2019).*

* cited by examiner

Temporal Convolutional Network (TCN)
950

NEURAL SIDELOBE CANCELLER FOR TARGET SPEECH SEPARATION

RELATED APPLICATIONS

This application claims the benefit of priority of U.S. Provisional Patent Application 63/309,895, filed Feb. 14, 2022, and entitled "Beamforming Using an In-Ear Audio Device," the contents of which is expressly incorporated herein by reference in its entirety.

BACKGROUND

In audio systems, beamforming refers to techniques that are used to isolate audio from a particular direction. Beamforming may be particularly useful when filtering out noise from non-desired directions. Beamforming may be used for various tasks, including isolating desired speech and/or voice commands to be executed by a speech-processing system.

BRIEF DESCRIPTION OF DRAWINGS

For a more complete understanding of the present disclosure, reference is now made to the following description taken in conjunction with the accompanying drawings.

DETAILED DESCRIPTION

Figure 1:
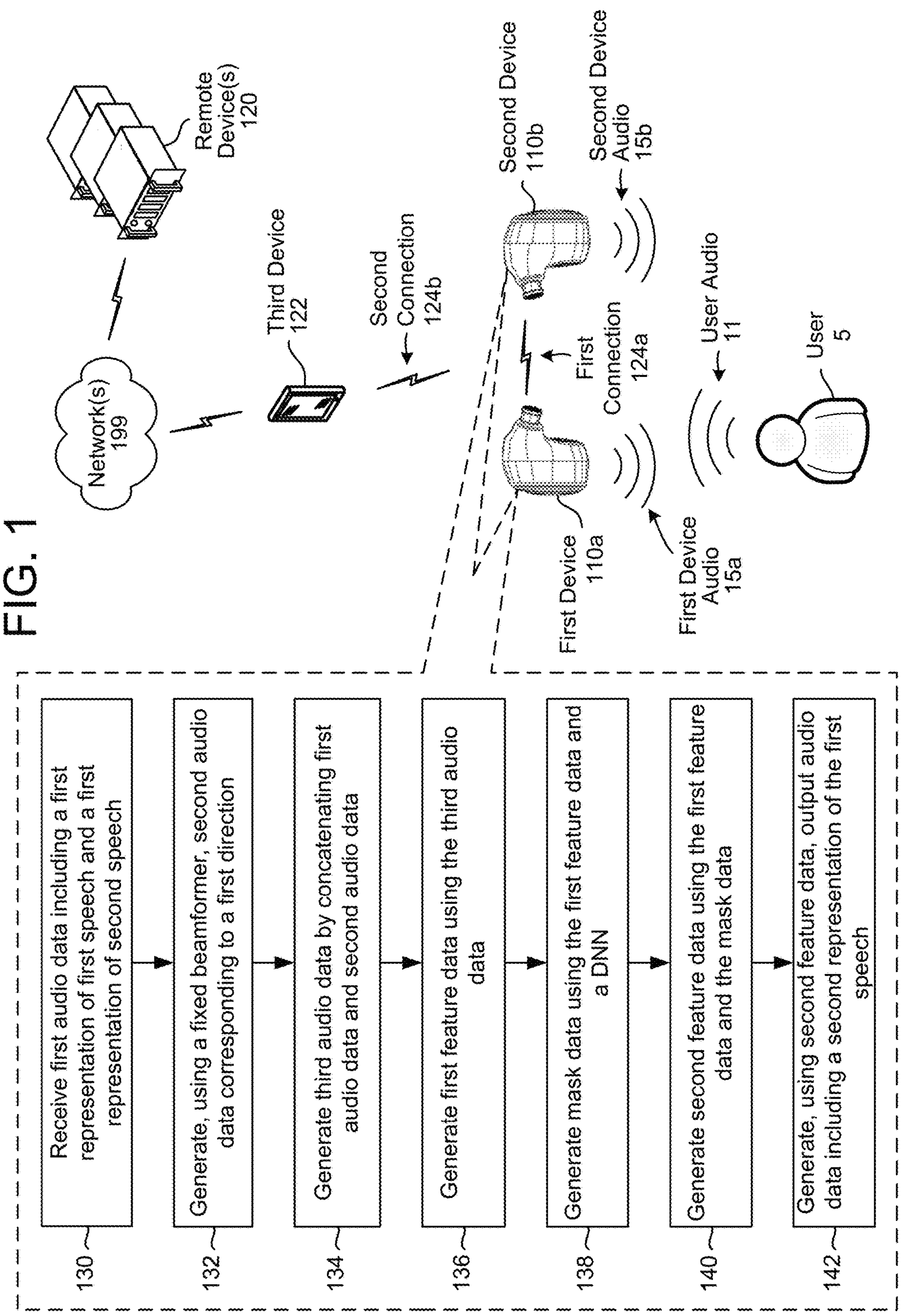
FIG. 1 illustrates a system for performing target speech separation according to embodiments of the present disclosure.

Some electronic devices may include an audio-based input/output interface. A user may interact with such a device—which may be, for example, a smartphone, tablet, computer, or other speech-controlled device—partially or exclusively using his or her voice and ears. Exemplary interactions include listening to music or other audio, communications such as telephone calls, audio messaging, and video messaging, and/or audio input for search queries, weather forecast requests, navigation requests, or other such interactions. The device may include one or more microphones for capturing voice input and hardware and/or software for converting the voice input into audio data. As explained in greater detail below, the device may further include hardware and/or software for analyzing the audio data and determining commands and requests therein and/or may send the audio data to a remote device for such analysis. The device may include an audio output device, such as a speaker, for outputting audio that in some embodiments responds to and/or prompts for the voice input.

Use of the above-described electronic device may, at times, be inconvenient, difficult, or impossible. Sometimes, such as while exercising, working, or driving, the user's hands may be occupied, and the user may not be able to hold the device in such a fashion as to effectively interact with the device's audio interface. Other times, the level of ambient noise may be too high for the device to accurately detect speech from the user or too high for the user to understand audio output from the device. In these situations, the user may prefer to connect headphones to the device. Headphones may also be used by a user to interact with a variety of other devices. As the term is used herein, "headphones" may refer to any wearable audio input/output device and includes headsets, earphones, earbuds, or any similar device. For added convenience, the user may choose to use wireless headphones, which communicate with the device—and optionally each other—via a wireless connection, such as Bluetooth, Wi-Fi, near-field magnetic induction (NFMI), Long-Term Evolution (LTE), 5G, or any other type of wireless connection.

In the present disclosure, for clarity, headphone components that are capable of wireless communication with both a third device and each other are referred to as "wireless earbuds," but the term "earbud" does not limit the present disclosure to any particular type of wired or wireless headphones. The present disclosure may further differentiate between a "right earbud," meaning a headphone component disposed in or near a right ear of a user, and a "left earbud," meaning a headphone component disposed in or near a left ear of a user. A "primary" earbud communicates with both a "secondary" earbud, using a first wireless connection (such as a Bluetooth connection); the primary earbud further communicates with a third device (such as a smartphone, smart watch, or similar device) using a second connection (such as a Bluetooth connection). The secondary earbud communicates directly with only with the primary earbud and does not communicate using a dedicated connection directly with the smartphone; communication therewith may pass through the primary earbud via the first wireless connection.

The primary and secondary earbuds may include similar hardware and software; in other instances, the secondary earbud contains only a subset of the hardware/software included in the primary earbud. If the primary and secondary earbuds include similar hardware and software, they may trade the roles of primary and secondary prior to or during operation. In the present disclosure, the primary earbud may be referred to as the "first device," the secondary earbud may be referred to as the "second device," and the smartphone or other device may be referred to as the "third device." The first, second, and/or third devices may communicate over a network, such as the Internet, with one or more server devices, which may be referred to as "remote device(s)."

Beamforming systems isolate audio from a particular direction in a multi-directional audio capture system. As the terms are used herein, an azimuth direction refers to a direction in the XY plane with respect to the system, and elevation refers to a direction in the Z plane with respect to the system. One technique for beamforming involves boosting target audio received from a desired azimuth direction and/or elevation while dampening noise audio received from a non-desired azimuth direction and/or non-desired elevation. Existing beamforming systems, however, may perform poorly in noisy environments and/or when the target audio is low in volume; in these systems, the audio may not be boosted enough to accurately separate speech signals and/or perform additional processing, such as automatic speech recognition (ASR) or speech-to-text processing.

Target speech separation is an important feature for next-generation hearable devices. Conventional beamformers often underperform in strong noise fields due to their high sidelobes. For example, performing beamforming forms a beampattern, which generates directions of effective gain or attenuation. The beampattern may exhibit a plurality of lobes, or regions of gain, with gain predominating in a particular direction (e.g., beampattern direction). While a main lobe may extend along the beampattern direction, the beampattern also includes side lobes, which are locations where the beampattern extends perpendicular to the beampattern direction that may capture undesired speech or acoustic noise.

Deep neural network (DNN) based methods for speech separation may perform well, but they may carry assumptions, for example, about the number of concurrent talkers. In the case of multiple concurrent talkers, certain DNN methods cannot unambiguously determine which voice the user intends to follow, without additional cues reflecting user's intention. In addition, many DNN based methods process large time windows and therefore suffer from high latency.

Proposed is a neural sidelobe canceller to overcome the limitations of conventional beamformers and DNN-based systems for target speech separation on hearable devices. The neural sidelobe canceller may selectively enhance speech only from the user's desired direction, while suppressing all non-speech sources and competing speech streams from other directions at a low algorithmic latency of 2.5 ms.

In the proposed system, microphone inputs are first processed through a fixed superdirective beamformer (SDB) with a steering vector pointing to the desired enhancement direction. SDB output is then concatenated with raw microphone inputs to form the input to a DNN-based sidelobe canceller, which operates in the time domain with 2.5-ms-long frames. Using such input, the DNN further enhances speech in the target direction, with all the sidelobes, noise sources and reverberation removed. The proposed system generalizes well to different enhancement directions, which can be controlled by the user by adjusting the input SDB direction.

FIG. 1 illustrates a system for performing target speech separation including a first device 110*a* (e.g., a primary earbud) and a second device 110*b* (e.g., a secondary earbud). The first device 110*a* and the second device 110*b* may communicate using a first wireless connection 124*a*, which may be a Bluetooth, NFMI, or similar connection. In other embodiments, the first device 110*a* and second device 110*b* communicate using a wired connection. The first device 110*a* communicates with a third device 122, such as a smartphone, smart watch, or similar device, using a second connection 124*b*, which may also be a wireless connection such as a Bluetooth Wi-Fi connection or a wired connection. The present disclosure may refer to particular Bluetooth protocols, such as classic Bluetooth, Bluetooth Low Energy ("BLE" or "LE"), Bluetooth Basic Rate ("BR"), Bluetooth Enhanced Data Rate ("EDR"), synchronous connection-oriented ("SCO"), and/or enhanced SCO ("eSCO"), but the present disclosure is not limited to any particular Bluetooth or other protocol. In some embodiments, however, a first wireless connection 124*a* between the first device 110*a* and the second device 110*b* is a low-power connection such as BLE; the second wireless connection 124*b* may include a high-bandwidth connection such as EDR in addition to or instead of a BLE connection. The third device 122 may communicate with one or more remote device(s) 120, which may be server devices, via network(s) 199, which may be the Internet, a wide- or local-area network, and/or any other network. The first device 110*a* may output first output audio 15*a*, and the second device 110*b* may output second output audio 15*b*. The first device 110*a* and second device 110*b* may capture input audio 11 from a user 5, process the input audio 11, and/or send the input audio 11 and/or processed input audio to the third device 122 and/or remote device(s) 120, as described in greater detail below.

As illustrated in FIG. 1, the first and/or second device 110*a*/110*b* may receive (130) first audio data including a first representation of first speech and a first representation of second speech. The device 110 may generate (132) second audio data corresponding to a first direction using a fixed beamformer, such as a superdirective beamformer (SDB) component. The device 110 may generate (134) third audio data by concatenating the first audio data and the second audio data.

The device 110 may generate (136) first feature data using the first audio data. For example, the device 110 may include an encoder component configured to apply a first number of filters (e.g., N=512 filters) to generate a high-dimensional representation of the third audio data. The device 110 may generate (138) mask data using the first feature data and a deep neural network (DNN) component, as described in greater detail below with regard to FIGS. 9A-13. The device 110 may then generate (140) second feature data using the first feature data and the mask data, as described in greater detail below with regard to FIG. 14. Using the second feature data, the device 110 may generate (142) output audio data including a second representation of the first speech. Thus, the device 110 may generate an enhanced target speech signal using a neural sidelobe canceller.

Figures 2A, 2B:
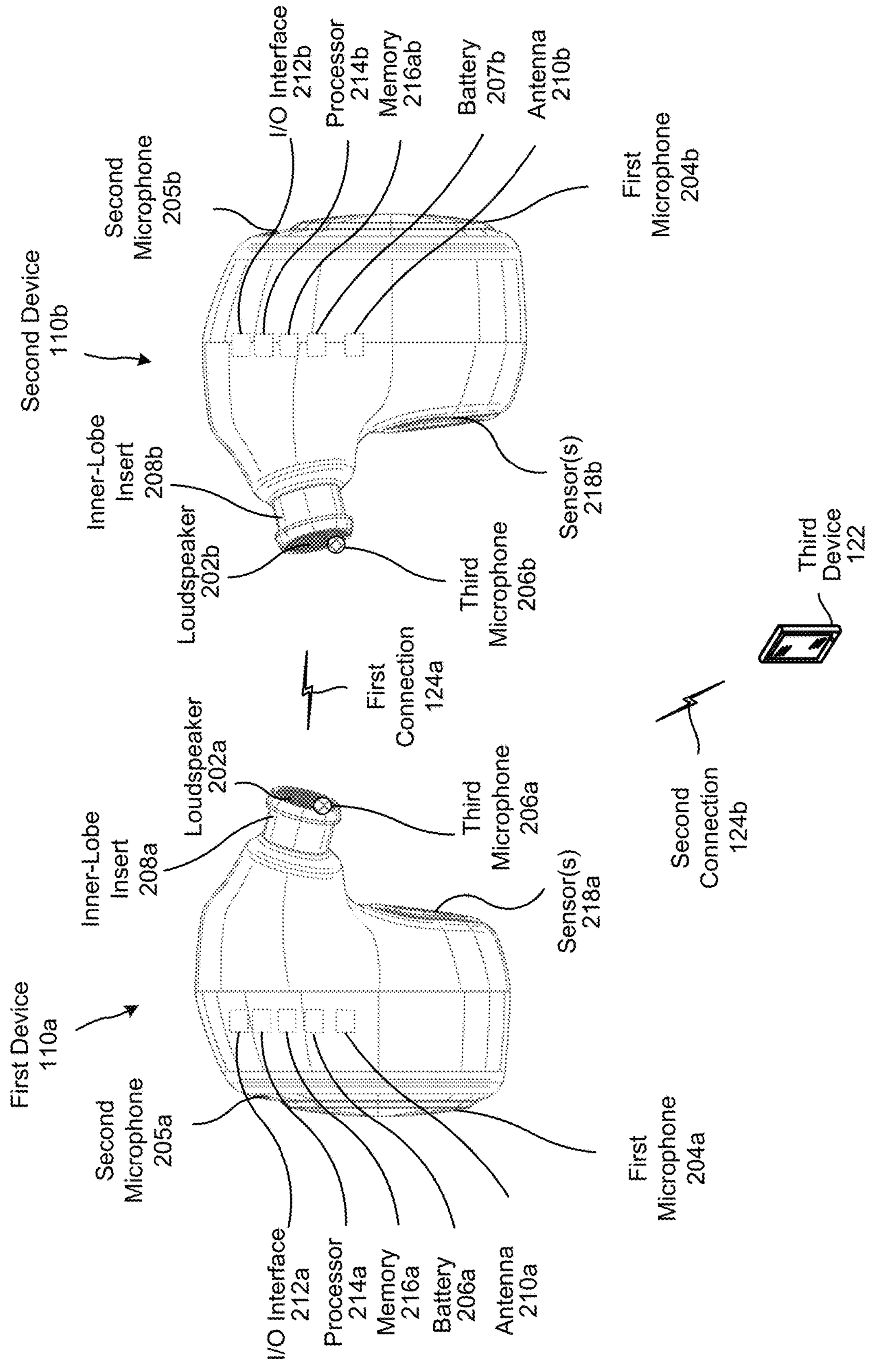
FIGS. 2A and 2B illustrate devices for performing target speech separation according to embodiments of the present disclosure.

FIGS. 2A and 2B illustrate an embodiment of the first device 110*a* and second device 110*b*, respectively. As shown, the first device 110*a* and second device 110*b* have similar features; in other embodiments, as noted above, the second device 110*b* (e.g., the secondary device) may have only a subset of the features of the first device 110*a*. As illustrated, the first device 110*a* and second device 110*b* are depicted as wireless earbuds having an inner-lobe insert; as mentioned above, however, the present disclosure is not limited to only wireless earbuds, and any wearable audio input/output system, such as a headset, over-the-ear headphones, or other such systems, is within the scope of the present disclosure.

The devices 110*a*/110*b* may include one or more loudspeaker(s) 114 (e.g., loudspeaker 202*a*/202*b*), one or more external microphone(s) 112 (e.g., first microphones 204*a*/204*b* and second microphones 205*a*/205*b*), and one or more internal microphone(s) 112 (e.g., third microphones 206*a*/206*b*). The loudspeaker 114 may be any type of loudspeaker, such as an electrodynamic speaker, electrostatic speaker, diaphragm speaker, or piezoelectric loudspeaker; the microphones 112 may be any type of microphones, such as piezoelectric or MEMS microphones. Each device 110*a*/110*b* may include one or more microphones 112.

As illustrated in FIGS. 2A-2B, the loudspeaker 202*a*/202*b* and the microphones 204*a*/204*b*/205*a*/205*b*/206*a*/206*b* may be mounted on, disposed on, or otherwise connected to the device 110*a*/110*b*. The devices 110*a*/110*b* further include an inner-lobe insert 208*a*/208*b* that may bring the loudspeaker 202*a*/202*b* and/or the third microphone(s) 206*a*/206*b* closer to the eardrum of the user and/or block some ambient noise.

Figure 3:
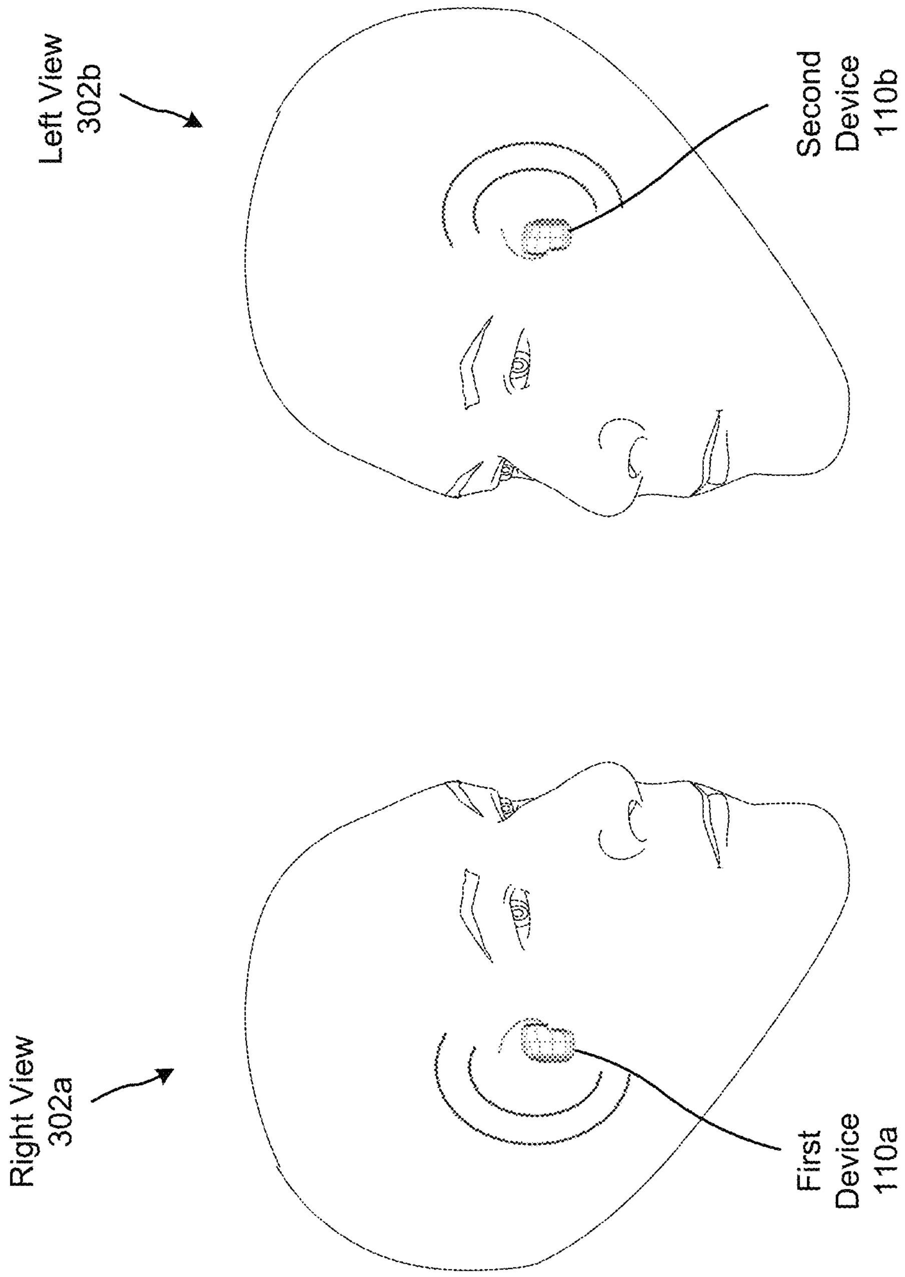
FIG. 3 illustrates various views of use of devices for performing target speech separation according to embodiments of the present disclosure.

One or more batteries 207*a*/207*b* may be used to supply power to the devices 110*a*/110*b*. One or more antennas 210*a*/210*b* may be used to transmit and/or receive wireless signals over the first connection 124*a* and/or second connection 124*b*; an I/O interface 212*a*/212*b* contains software and hardware to control the antennas 210*a*/210*b* and transmit signals to and from other components. A processor 214*a*/214*b* may be used to execute instructions in a memory 216*a*/216*b*; the memory 216*a*/216*b* may include volatile memory (e.g., random-access memory) and/or non-volatile memory or storage (e.g., flash memory). One or more sensors 218*a*/218*b*, such as accelerometers, gyroscopes, or any other such sensor may be used to sense physical properties related to the devices 110*a*/110*b*, such as orientation; this orientation may be used to determine whether either or both of the devices 110*a*/110*b* are currently disposed in an ear of the user (i.e., the "in-ear" status of each device). FIG. 3 illustrates a right view 302*a* and a left view 302*b* of a user of the first device 110*a* and the second device 110*b*.

Figure 4A:
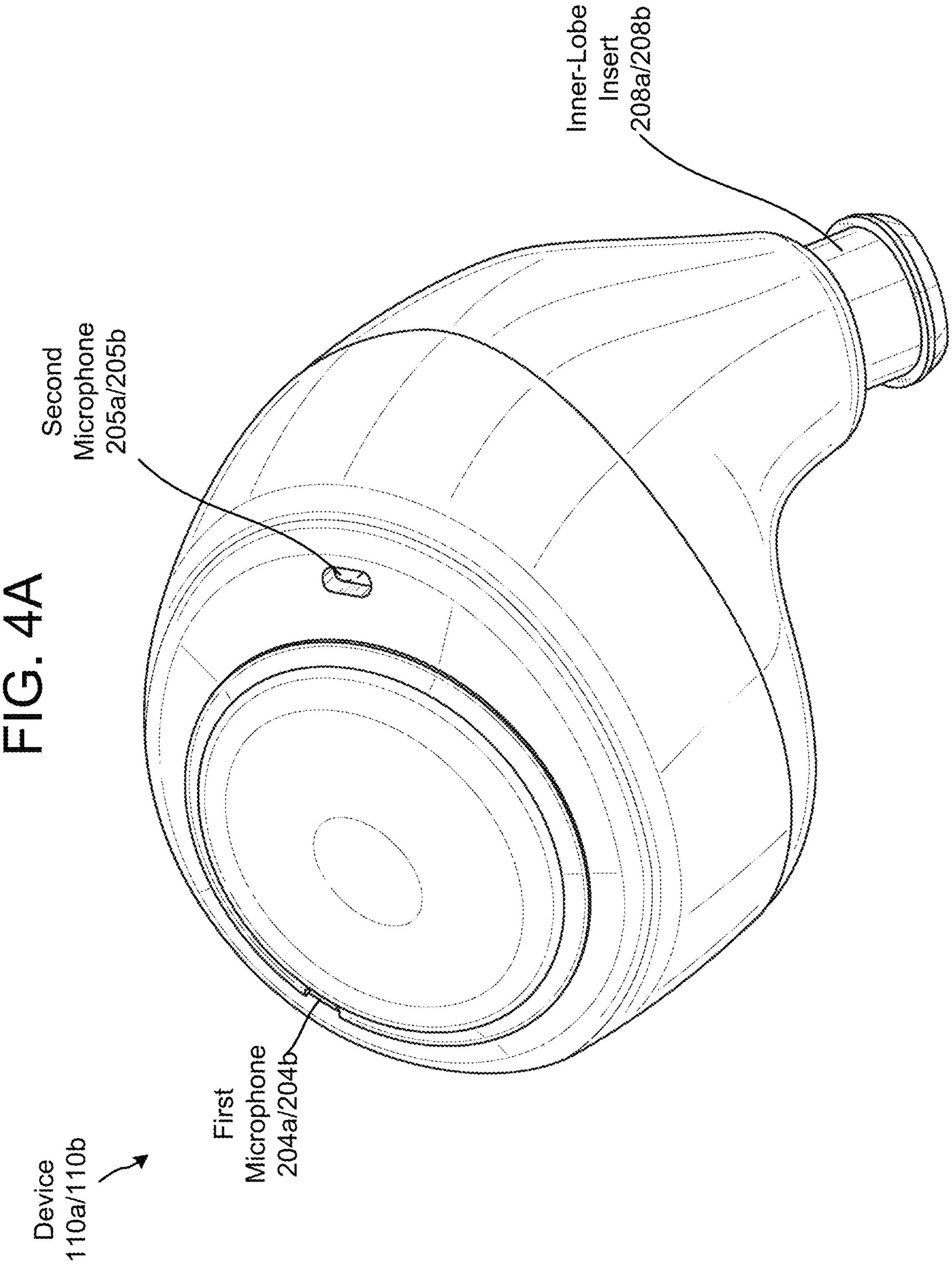
FIGS. 4A, 4B, and 4C illustrate various views of devices for performing target speech separation according to embodiments of the present disclosure.
Figure 4B:
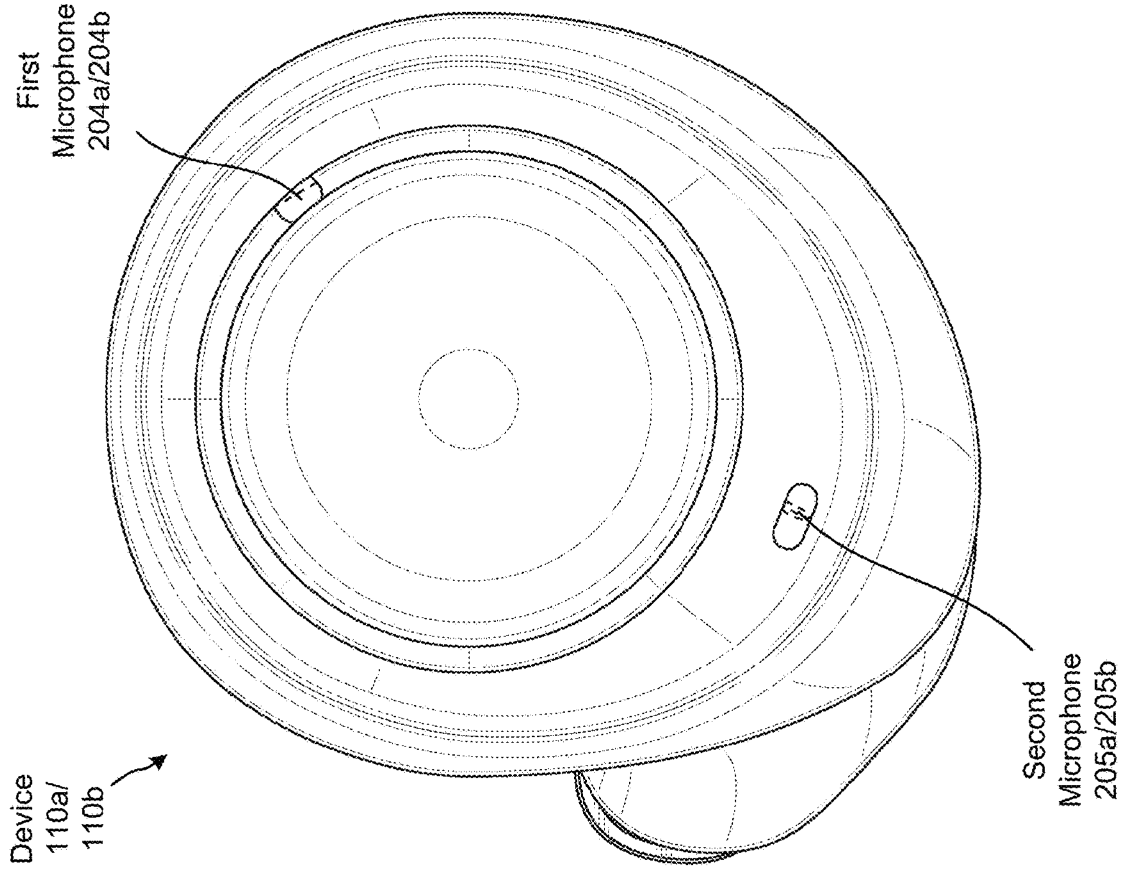
Figure 4C:
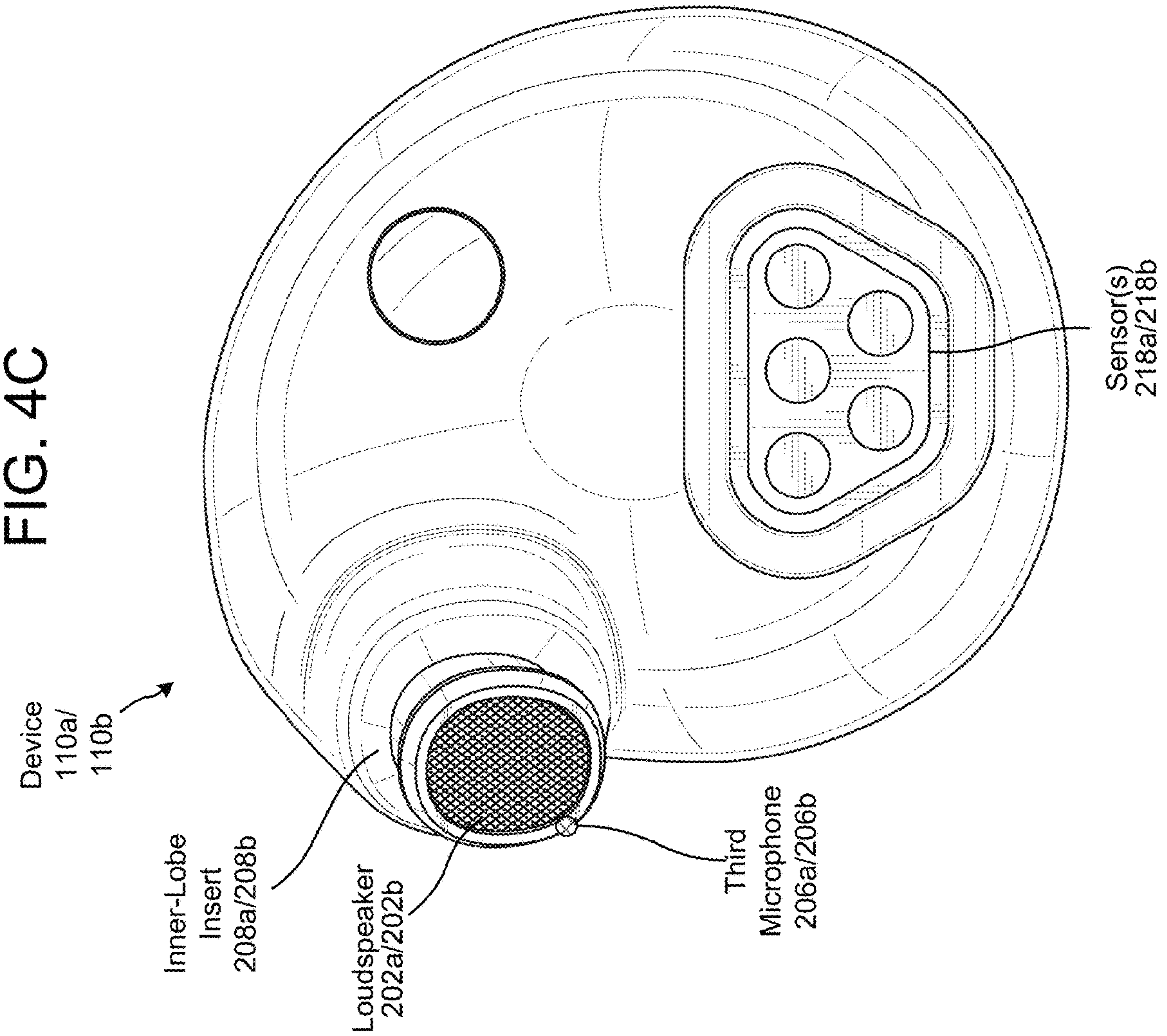

FIGS. 4A, 4B, and 4C illustrate various views of devices for performing target speech separation according to embodiments of the present disclosure. FIG. 4A illustrates one embodiment of placement of the first microphone 204*a*/204*b* and of the second microphone 205*a*/205*b*. The first microphone 204*a*/204*b* is disposed farther from the inner-lobe insert 208*a*/208*b* than is the second microphone 205*a*/205*b*; the first microphone 204*a*/204*b* may thus be disposed closer to the mouth of the user and may therefore receive audio having a higher signal-to-noise ratio than does the second microphone 205*a*/205*b*. FIG. 4B illustrates another one embodiment of the placement of the first microphone 204*a*/204*b* and the second microphone 205*a*/205*b*. FIG. 4C illustrates one embodiment of the placement of the loudspeaker 202*a*/202*b*, third microphone 206*a*/206*b*, inner-lobe insert 208*a*/208*b*, and sensor(s) 218*a*/218*b*. The present disclosure is not limited, however, to only these placements, and other placements of the microphones are within its scope.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

The device 110 may include multiple microphones 112 configured to capture sound and pass the resulting audio signal created by the sound to a downstream component, such as an SDB component discussed below. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. For example, a particular direction may be associated with azimuth angles divided into bins (e.g., 0-45 degrees, 46-90 degrees, and so forth). To isolate audio from a particular direction, the device 110 may apply a variety of audio filters to the output of the microphones where certain audio is boosted while other audio is dampened, to create isolated audio corresponding to a particular direction, which may be referred to as a beam. While in some examples the number of beams may correspond to the number of microphones, the disclosure is not limited thereto and the number of beams may be independent of the number of microphones 112. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, as explained below.

The device 110 may use various techniques to determine the beam corresponding to the look-direction. For example, the device 110 may use techniques (either in the time domain or in the sub-band domain) such as calculating a signal-to-noise ratio (SNR) for each beam, performing voice activity detection (VAD) on each beam, or the like, although the disclosure is not limited thereto.

After identifying the look-direction associated with the speech, the device 110 may use a FBF unit or other such component to isolate audio coming from the look-direction using techniques known to the art and/or explained herein. For example, the device 110 may boost audio coming from a particular direction, thus increasing the amplitude of audio data corresponding to speech from user relative to other audio captured from other directions. In this manner, noise from diffuse sources that is coming from all the other directions will be dampened relative to the desired audio (e.g., speech from the user) coming from the selected direction.

Figure 5:
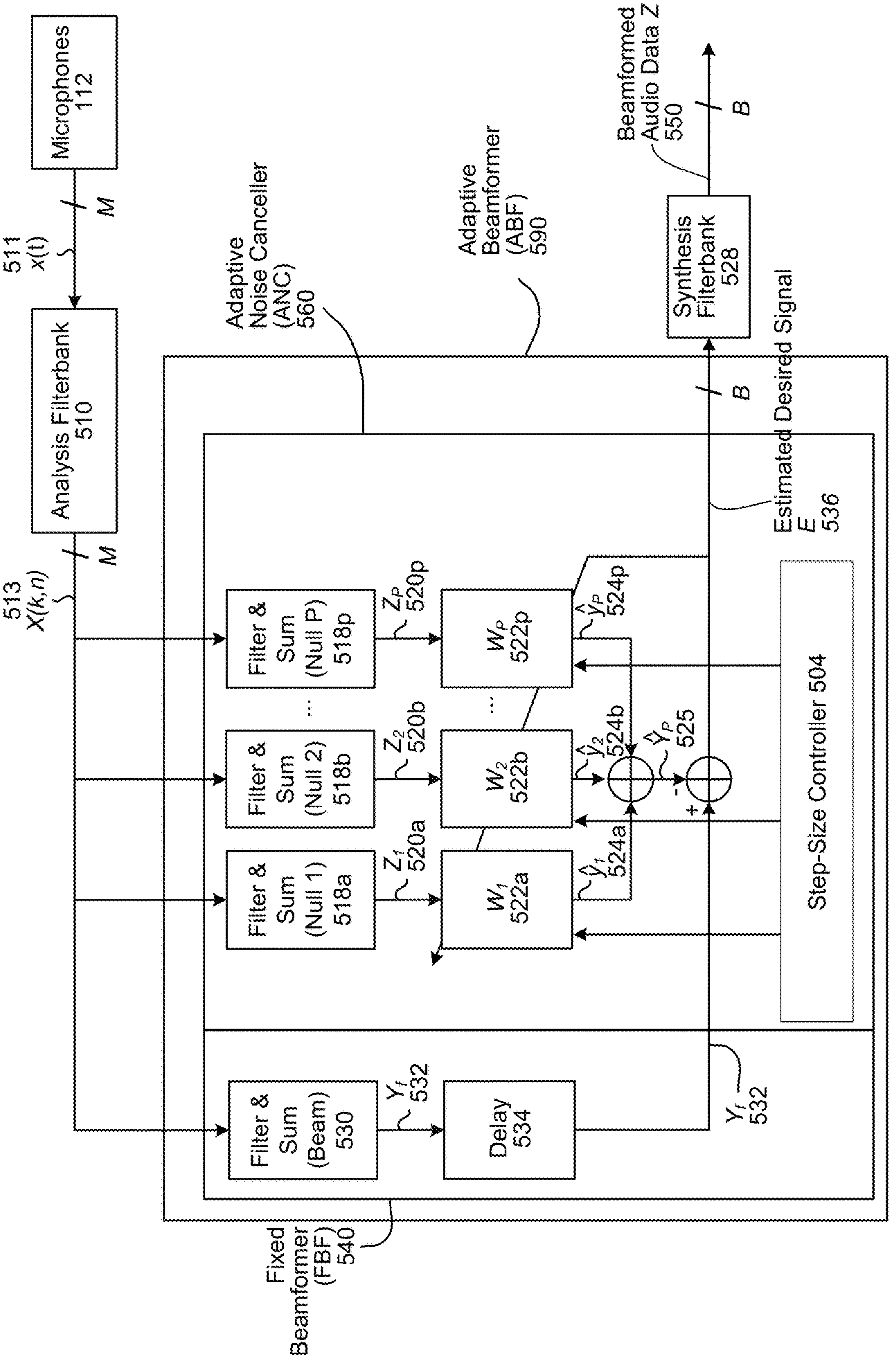
FIG. 5 illustrates a beamforming device that combines a fixed beamformer unit and an adaptive beamformer unit according to embodiments of the present disclosure.

FIG. 5 illustrates a high-level conceptual block diagram of a device 110 configured to performing beamforming using a fixed beamformer unit and an adaptive noise canceller that can remove noise from particular directions using adaptively controlled coefficients which can adjust how much noise is cancelled from particular directions. The FBF unit 540 may be a separate component or may be included in another component such as an adaptive beamformer (ABF) unit 590. As explained below, the FBF unit may operate a filter and sum component 530 to isolate the first audio signal from the direction of an audio source.

The device 110 may also operate an adaptive noise canceller (ANC) unit 560 to amplify audio signals from directions other than the direction of an audio source. Those audio signals represent noise signals so the resulting amplified audio signals from the ABF unit may be referred to as noise reference signals 520, discussed further below. The device 110 may then weight the noise reference signals, for example using filters 522 discussed below. The device may combine the weighted noise reference signals 524 into a combined (weighted) noise reference signal 525. Alternatively the device may not weight the noise reference signals and may simply combine them into the combined noise reference signal 525 without weighting. The device may then subtract the combined noise reference signal 525 from the amplified first audio signal 532 to obtain a difference 536. The device may then output that difference, which represents the desired output audio signal with the noise removed. The diffuse noise is removed by the FBF unit when determining the signal 532 and the directional noise is removed when the combined noise reference signal 525 is subtracted. The device may also use the difference to create updated weights (for example for filters 522) to create updated weights that may be used to weight future audio signals. The step-size controller 504 may be used modulate the rate of adaptation from one weight to an updated weight.

In this manner noise reference signals are used to adaptively estimate the noise contained in the output signal of the FBF unit using the noise-estimation filters 522. This noise estimate is then subtracted from the FBF unit output signal to obtain the final ABF unit output signal. The ABF unit output signal is also used to adaptively update the coefficients of the noise-estimation filters. Lastly, we make use of a robust step-size controller to control the rate of adaptation of the noise estimation filters.

As shown in FIG. 5, input audio data 511 captured by the microphones 112 may be input into an analysis filterbank 510. The filterbank 510 may include a uniform discrete Fourier transform (DFT) filterbank which converts input audio data 511 in the time domain (e.g., x(t)) into microphone outputs 513 in the sub-band domain (e.g., X(k,n)). The audio signal X(k,n) may incorporate audio signals corresponding to multiple different microphones as well as different sub-bands (i.e., frequency ranges) as well as different frame indices (i.e., time ranges). Thus the audio signal from the mth microphone may be represented as $X_m(k,n)$, where k denotes the sub-band index and n denotes the frame index. The combination of all audio signals for all microphones for a particular sub-band index frame index may be represented as X(k,n).

Figure 6:
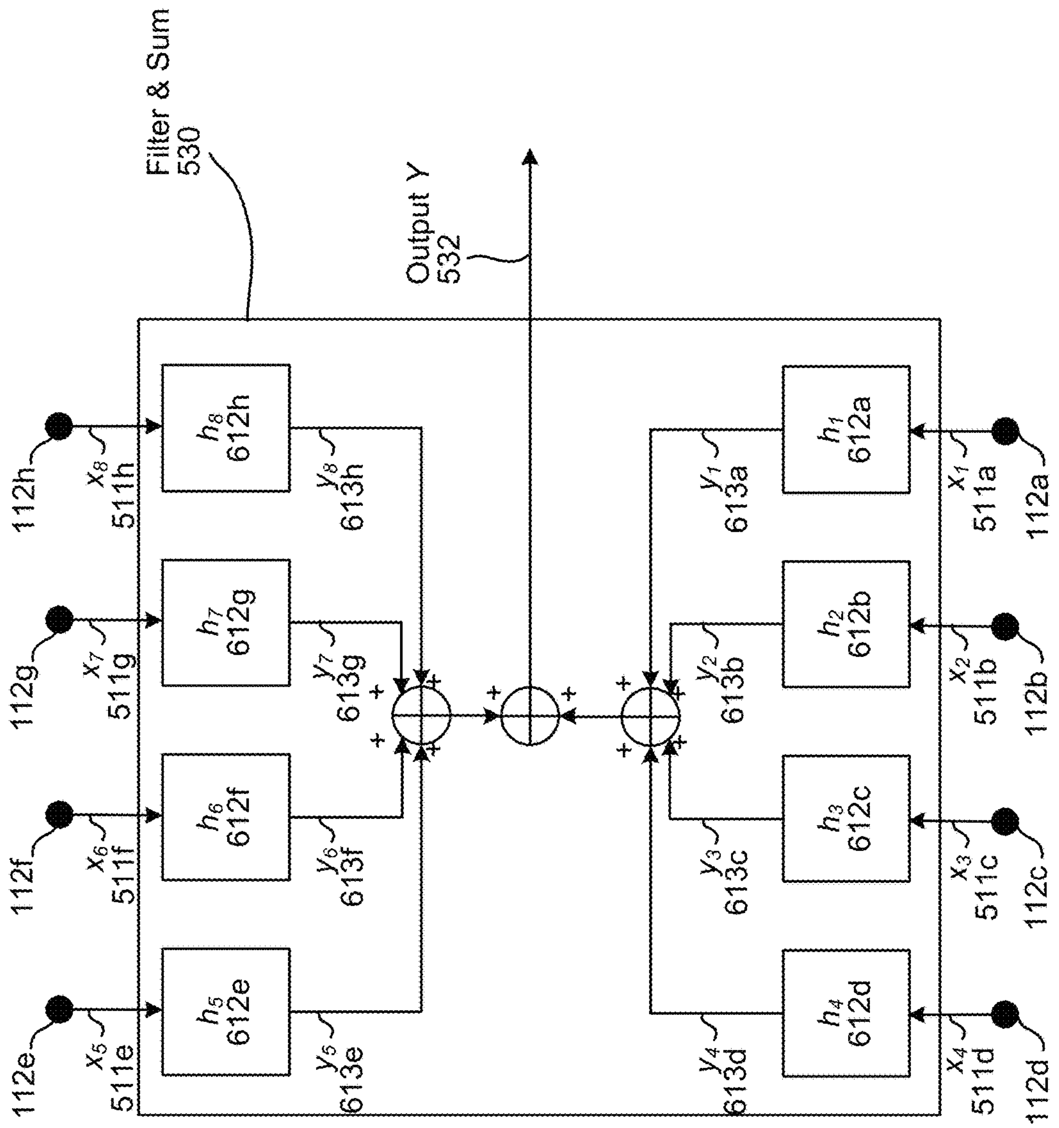
FIG. 6 illustrates a filter and sum component according to embodiments of the present disclosure.

The microphone outputs 513 may be passed to the FBF unit 540 including the filter and sum unit 530. The FBF unit 540 may be implemented as a robust super-directive beamformer unit, delayed sum beamformer unit, or the like. The FBF unit 540 is presently illustrated as a super-directive beamformer (SDB) unit due to its improved directivity properties. The filter and sum unit 530 takes the audio signals from each of the microphones and boosts the audio signal from the microphone associated with the desired look direction and attenuates signals arriving from other microphones/directions. The filter and sum unit 530 may operate as illustrated in FIG. 6. In some examples, the filter and sum unit 530 may be configured to match the number of microphones 112 included in the device 110. For example, for a device 110 with eight microphones 112*a*-112*h*, the filter and sum unit may have eight filter blocks 612. The input audio signals $x_1$ 511*a* through $x_8$ 511*h* for each microphone (e.g., microphones 1 through 8) are received by the filter and sum unit 530. The audio signals $x_1$ 511*a* through $x_8$ 511*h* correspond to individual microphones 112*a* through 112*h*, for example audio signal $x_1$ 511*a* corresponds to microphone 112*a*, audio signal $x_2$ 511*b* corresponds to microphone 112*b* and so forth. Although shown as originating at the microphones, the audio signals $x_1$ 511*a* through $x_8$ 511*h* may be in the sub-band domain and thus may actually be output by the analysis filterbank before arriving at the filter and sum component 530. Each filter block 612 is also associated with a particular microphone. Each filter block is configured to either boost (e.g., increase) or dampen (e.g., decrease) its respective incoming audio signal by the respective beamformer filter coefficient h depending on the configuration of the FBF unit. Each resulting filtered audio signal y 613 will be the audio signal x 511 weighted by the beamformer filter coefficient h of the filter block 612. For example, $y_1=x_1*h_1$, $y_2=x_2*h_2$, and so forth. The filter coefficients are configured for a particular FBF unit associated with a particular beam.

Figure 7:
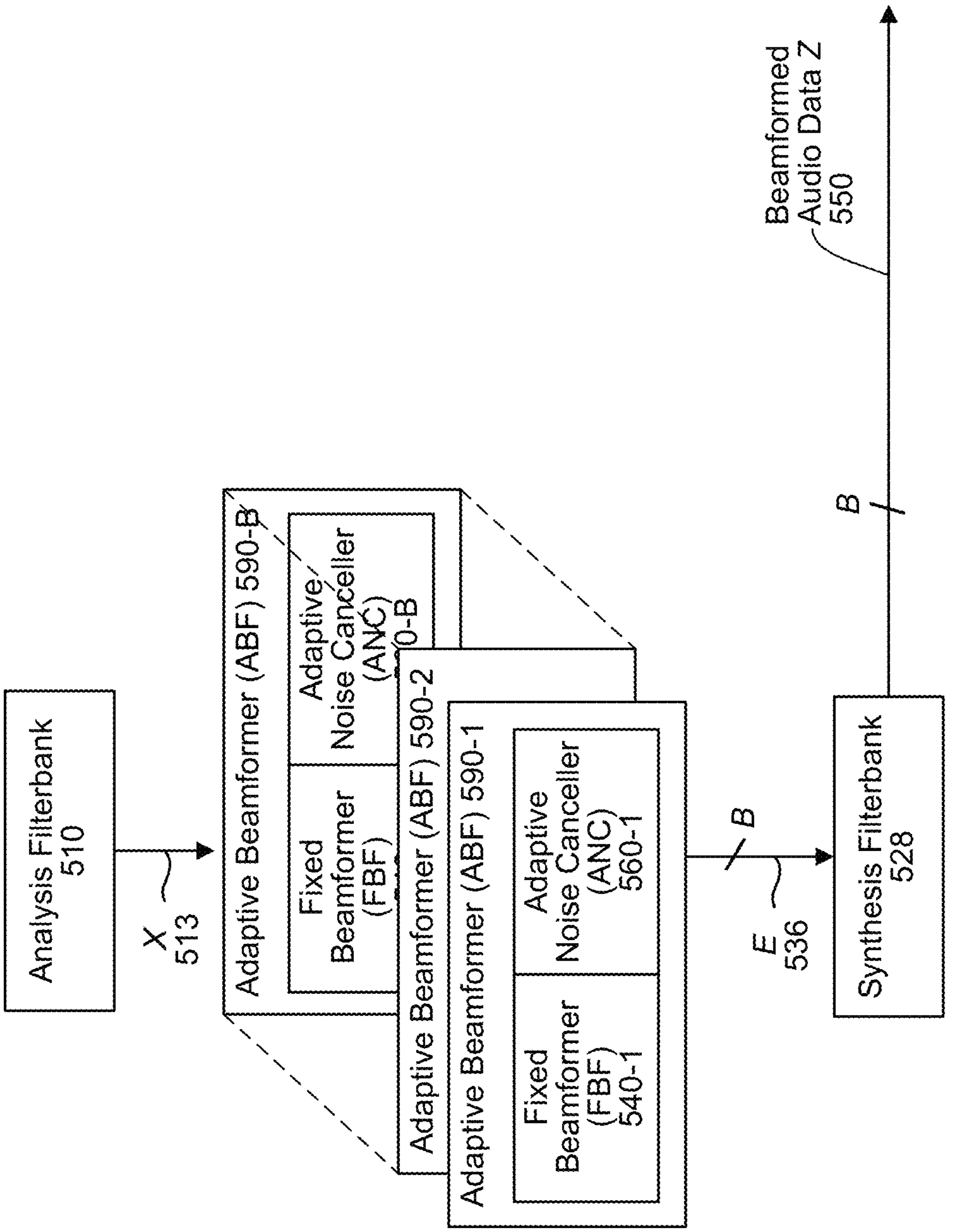
FIG. 7 illustrates a multiple FBF/ABF beamformer unit configuration for each beam according to embodiments of the present disclosure.

As illustrated in FIG. 7, the adaptive beamformer (ABF) unit 590 configuration (including the FBF unit 540 and the ANC unit 560) illustrated in FIG. 5, may be implemented multiple times in a single device 110. The number of adaptive beamformer (ABF) unit 590 blocks may correspond to the number of beams B. For example, if there are eight beams, there may be eight FBF units 540 and eight ANC units 560. Each adaptive beamformer (ABF) unit 590 may operate as described in reference to FIG. 5, with an individual output E 536 for each beam created by the respective adaptive beamformer (ABF) unit 590. Thus, B different outputs 536 may result. For device configuration purposes, there may also be B different other components, such as the synthesis filterbank 528, but that may depend on device configuration. Each individual adaptive beamformer (ABF) unit 590 may result in its own beamformed audio data Z 550, such that there may be B different beamformed audio data portions Z 550. Each beam's respective beamformed audio data Z 550 may be in a format corresponding to an input audio data 511 or in an alternate format. For example, the input audio data 511 and/or the beamformed audio data Z 550 may be sampled at a rate corresponding to 16 kHz and a mono-channel at 16 bits per sample, little endian format. Audio data in little endian format corresponds to storing the least significant byte of the audio data in the smallest address, as opposed to big endian format where the most significant byte of the audio data is stored in the smallest address.

Each particular FBF unit may be tuned with filter coefficients to boost audio from one of the particular beams. For example, FBF unit 540-1 may be tuned to boost audio from beam 1, FBF unit 540-2 may be tuned to boost audio from beam 2 and so forth. If the filter block is associated with the particular beam, its beamformer filter coefficient h will be high whereas if the filter block is associated with a different beam, its beamformer filter coefficient h will be lower. For example, for FBF unit 540-7, direction 7, the beamformer filter coefficient $h_7$ for filter 612*g* may be high while beamformer filter coefficients $h_1$-$h_6$ and $h_8$ may be lower. Thus the filtered audio signal $y_7$ will be comparatively stronger than the filtered audio signals $y_1$-$y_6$ and $y_8$ thus boosting audio from direction 7 relative to the other directions. The filtered audio signals will then be summed together to create the output audio signal. The filtered audio signals will then be summed together to create the output audio signal $Y_f$ 532. Thus, the FBF unit 540 may phase align microphone audio data toward a give n direction and add it up. So signals that are arriving from a particular direction are reinforced, but signals that are not arriving from the look direction are suppressed. The robust FBF coefficients are designed by solving a constrained convex optimization problem and by specifically taking into account the gain and phase mismatch on the microphones.

The individual beamformer filter coefficients may be represented as $H_{BF,m}(r)$, where r=0, . . . . R, where R denotes the number of beamformer filter coefficients in the subband domain. Thus, the output $Y_f$ 532 of the filter and sum unit 530 may be represented as the summation of each microphone signal filtered by its beamformer coefficient and summed up across the M microphones:

$$Y(k, n) = \sum_{m=1}^{M} \sum_{r=0}^{R} H_{BF,m}(r) X_m(k, n-r) \quad [1]$$

Turning once again to FIG. 5, the output $Y_f$ 532, expressed in Equation 1, may be fed into a delay component 534, which delays the forwarding of the output Y until further adaptive noise canceling functions as described below may be performed. One drawback to output $Y_f$ 532, however, is that it may include residual directional noise that was not canceled by the FBF unit 540. To remove that directional noise, the device 110 may operate an adaptive noise canceller (ANC) unit 560 which includes components to obtain the remaining noise reference signal which may be used to remove the remaining noise from output Y.

As shown in FIG. 5, the adaptive noise canceller may include a number of nullformer blocks 518*a* through 518*p*. The device 110 may include P number of nullformer blocks 518 where P corresponds to the number of channels, where each channel corresponds to a direction in which the device may focus the nullformers 518 to isolate detected noise. The number of channels P is configurable and may be predetermined for a particular device 110. Each nullformer block is configured to operate similarly to the filter and sum block 530, only instead of the filter coefficients for the nullformer blocks being selected to boost the look ahead direction, they are selected to boost one of the other, non-look ahead directions. Thus, for example, nullformer 518*a* is configured to boost audio from direction 1, nullformer 518*b* is configured to boost audio from direction 2, and so forth. Thus, the nullformer may actually dampen the desired audio (e.g., speech) while boosting and isolating undesired audio (e.g., noise). For example, nullformer 518*a* may be configured (e.g., using a high filter coefficient $h_1$ 612*a*) to boost the signal from microphone 112*a*/direction 1, regardless of the look ahead direction. Nullformers 518*b* through 518*p* may operate in similar fashion relative to their respective microphones/directions, though the individual coefficients for a particular channel's nullformer in one beam pipeline may differ from the individual coefficients from a nullformer for the same channel in a different beam's pipeline.

The output Z 520 of each nullformer 518 will be a boosted signal corresponding to a non-desired direction. As audio from non-desired direction may include noise, each signal Z 520 may be referred to as a noise reference signal. Thus, for each channel 1 through P the adaptive noise canceller (ANC) unit 560 calculates a noise reference signal Z 520, namely $Z_1$ 520*a* through $Z_P$ 520*p*. Thus, the noise reference signals that are acquired by spatially focusing towards the various noise sources in the environment and away from the desired look-direction. The noise reference signal for channel p may thus be represented as $Z_p$(k,n) where $Z_P$ is calculated as follows:

$$Z_p(k, n\} = \sum_{m=1}^{M}\sum_{r=0}^{R} H_{NF,m}(p, r)X_m(k, n-r) \quad [2]$$

where $H_{NF,m}$(p,r) represents the nullformer coefficients for reference channel p.

As described above, the coefficients for the nullformer filters 612 are designed to form a spatial null toward the look ahead direction while focusing on other directions, such as directions of dominant noise sources. The output from the individual nullformers $Z_1$ 520*a* through $Z_P$ 520*p* thus represent the noise from channels 1 through P.

The individual noise reference signals may then be filtered by noise estimation filter blocks 522 configured with weights W to adjust how much each individual channel's noise reference signal should be weighted in the eventual combined noise reference signal Ŷ 525. The noise estimation filters (further discussed below) are selected to isolate the noise to be removed from output $Y_f$532. The individual channel's weighted noise reference signal ŷ 524 is thus the channel's noise reference signal Z multiplied by the channel's weight W. For example, $\hat{y}_1=Z_1*W_1$, $\hat{y}_2=Z_2*W_2$, and so forth. Thus, the combined weighted noise estimate Ŷ 525 may be represented as:

$$\hat{Y}_P(k, n) = \sum_{l=0}^{L} W_P(k, n, l)Z_P(k, n-l) \quad [3]$$

where $W_P$(k, n, l) is the l th element of $W_P$(k, n) and l denotes the index for the filter coefficient in subband domain. The noise estimates of the P reference channels are then added to obtain the overall noise estimate:

$$\hat{Y}(k, n) = \sum_{p=1}^{P} \hat{Y}_p(k, n) \quad [4]$$

The combined weighted noise reference signal Y 525, which represents the estimated noise in the audio signal, may then be subtracted from the FBF unit output $Y_f$ 532 to obtain a signal E 536, which represents the error between the combined weighted noise reference signal f 525 and the FBF unit output $Y_f$532. That error, E 536, is thus the estimated desired non-noise portion (e.g., target signal portion) of the audio signal and may be the output of the adaptive noise canceller (ANC) unit 560. That error, E 536, may be represented as:

$$E(k,n)=Y(k,n)-\hat{Y}(k,n) \quad [5]$$

As shown in FIG. 5, the ABF unit output signal 536 may also be used to update the weights W of the noise estimation filter blocks 522 using sub-band adaptive filters, such as with a normalized least mean square (NLMS) approach:

$$W_p(k, n) = W_p(k, n-1) + \frac{\mu_p(k, n)}{\|Z_p(k, n)\|^2 + \varepsilon} Z_p(k, n)E(k, n) \quad [6]$$

where $Z_p(k, n)=[Z_p(k, n)\ Z_p(k, n-1) \ldots Z_p(k, n-L)]^T$ is the noise estimation vector for the pth channel, $\mu_p$(k,n) is the adaptation step-size for the pth channel, and ε is a regularization factor to avoid indeterministic division. The weights may correspond to how much noise is coming from a particular direction.

As can be seen in Equation [6], the updating of the weights W involves feedback. The weights Ware recursively updated by the weight correction term (the second half of the right hand side of Equation 6) which depends on the adaptation step size, $\mu_p$(k,n), which is a weighting factor adjustment to be added to the previous weighting factor for the filter to obtain the next weighting factor for the filter (to be applied to the next incoming signal). To ensure that the weights are updated robustly (to avoid, for example, target signal cancellation) the step size $\mu_p$(k,n) may be modulated according to signal conditions. For example, when the desired signal arrives from the look-direction, the step-size is significantly reduced, thereby slowing down the adaptation process and avoiding unnecessary changes of the weights W. Likewise, when there is no signal activity in the look-direction, the step-size may be increased to achieve a larger value so that weight adaptation continues normally. The step-size may be greater than 0, and may be limited to a maximum value. Thus, the device may be configured to determine when there is an active source (e.g., a speaking user) in the look-direction. The device may perform this determination with a frequency that depends on the adaptation step size.

The step-size controller 504 will modulate the rate of adaptation. Although not shown in FIG. 5, the step-size controller 504 may receive various inputs to control the step size and rate of adaptation including the noise reference signals 520, the FBF unit output $Y_f$532, the previous step size, the nominal step size (described below) and other data. The step-size controller may calculate Equations 6-13 below. In particular, the step-size controller 504 may compute the adaptation step-size for each channel p, sub-band k, and frame n. To make the measurement of whether there is an active source in the look-direction, the device may measure a ratio of the energy content of the beam in the look direction (e.g., the look direction signal in output $Y_f$532) to the ratio of the energy content of the beams in the non-look directions (e.g., the non-look direction signals of noise reference signals $Z_1$ 520*a* through $Z_P$ 520*p*). This may be referred to as a beam-to-null ratio (BNR). For each subband, the device may measure the BNR. If the BNR is large, then an active source may be found in the look direction, if not, an active source may not be in the look direction.

The BNR may be computed as:

$$BNR_p(k, n) = \frac{B_{YY}(k, n)}{N_{ZZ,p}(k, n) + \delta}, k \in [k_{LB}, k_{UB}] \quad [7]$$

where, $k_{LB}$ denotes the lower bound for the subband range bin and $k_{UB}$ denotes the upper bound for the subband range bin under consideration, and δ is a regularization factor. Further, $B_{YY}$(k,n) denotes the powers of the fixed beamformer output signal (e.g., output $Y_f$ 532) and $N_{ZZ,p}$(k,n) denotes the powers of the pth nullformer output signals (e.g., the noise reference signals $Z_1$ 520*a* through $Z_P$ 520*p*). The powers may be calculated using first order recursive averaging as shown below:

$$B_{YY}(k,n)=\alpha B_{YY}(k,n-1)+(1-\alpha)|Y(k,n)|^2 \quad [8]$$

$$N_{ZZ,p}(k,n)=\alpha N_{ZZ,p}(k,n-1)+(1-\alpha)|Z_p(k,n)|^2 \quad [8]$$

where, α∈[0,1] is a smoothing parameter.

The BNR values may be limited to a minimum and maximum value as follows $BNR_p(k, n) \in [BNR_{min}, BNR_{max}]$, and the BNR may be averaged across the subband bins:

$$BNR_p(n) = \frac{1}{(k_{UB} - k_{LB} + 1)} \sum_{k_{LB}}^{k_{UB}} BNR_p(k, n) \quad [9]$$

The above value may be smoothed recursively to arrive at the mean BNR value:

$$\overline{BNR}_p(n) = \beta \overline{BNR}_p(n-1) + (1-\beta) BNR_p(n) \quad [10]$$

where $\beta$ is a smoothing factor.

The mean BNR value may then be transformed into a scaling factor in the interval of [0,1] using a sigmoid transformation:

$$\xi(n) = 1 - 0.5\left(1 + \frac{\upsilon(n)}{1 + |\upsilon(n)|}\right) \quad [11]$$

$$\upsilon(n) = \gamma(\overline{BNR}_p(n) - \sigma) \quad [12]$$

where $\gamma$ and $\sigma$ are tunable parameters that denote the slope ($\gamma$) and point of inflection ($\sigma$) for the sigmoid function.

Using Equation 11, the adaptation step-size for subband k and frame-index n is obtained as:

$$\mu_p(k, n) = \xi(n)\left(\frac{N_{ZZ,p}(k, n)}{B_{YY}(k, n) + \delta}\right)\mu_o \quad [13]$$

where $\mu_o$ is a nominal step-size. $\mu_o$ may be used as an initial step size with scaling factors and the processes above used to modulate the step size during processing.

At a first time period, audio signals from the microphones 112 may be processed as described above using a first set of weights for the filters 522. Then, the error E 536 associated with that first time period may be used to calculate a new set of weights for the filters 522, where the new set of weights is determined using the step size calculations described above. The new set of weights may then be used to process audio signals from the microphones 112 associated with a second time period that occurs after the first time period. Thus, for example, a first filter weight may be applied to a noise reference signal associated with a first audio signal for a first microphone/first direction from the first time period. A new first filter weight may then be calculated using the method above and the new first filter weight may then be applied to a noise reference signal associated with the first audio signal for the first microphone/first direction from the second time period. The same process may be applied to other filter weights and other audio signals from other microphones/directions.

The above processes and calculations may be performed across sub-bands k, across channels p and for audio frames n, as illustrated in the particular calculations and equations.

The estimated non-noise (e.g., output) audio signal E 536 may be processed by a synthesis filterbank 528 which converts the signal 536 into time-domain beamformed audio data Z 550 which may be sent to a downstream component for further operation. As illustrated in FIG. 7, there may be one component audio signal E 536 for each beam, thus for B beams there may be B audio signals E 536. Similarly, there may be one stream of beamformed audio data Z 550 for each beam, thus for B beams there may be B beamformed audio signals B 550. For example, a first beamformed audio signal may correspond to a first beam and to a first direction, a second beamformed audio signal may correspond to a second beam and to a second direction, and so forth.

As shown in FIGS. 5 and 7, the input audio data from the microphones 112 may include audio data 511 for each microphone 0 through M in the time domain, which may be converted by the analysis filterbank into spectral domain audio signals X 513 for each microphone 0 through M. The beamformer unit may then convert the audio signals X 513 into beamformer output signals E 536 in the spectral domain, with one signal for each beam 0 through B. The synthesis filterbank may then may convert the signals E 536 into time domain beamformer audio data Z 550, with one set of audio data Z 550 for each beam 0 through B.

Figure 8:
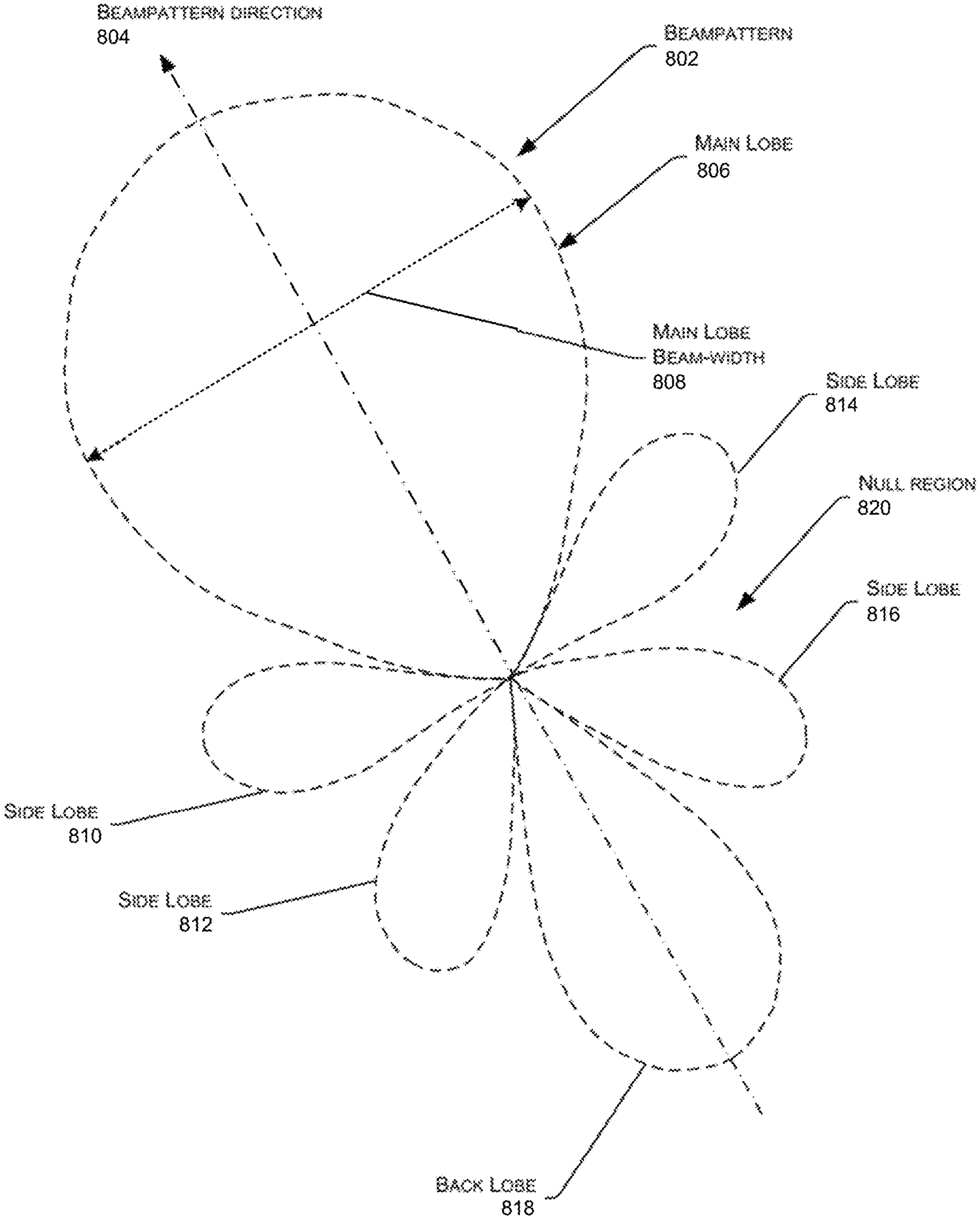
FIG. 8 is an illustration of beamforming according to embodiments of the present disclosure.

FIG. 8 is an illustration of beamforming according to embodiments of the present disclosure. As illustrated in FIG. 8, performing beamforming, such as by applying a set of beamforming coefficient values to signal data acquired from the microphones 112 of the device 110, forms a beampattern 802. The beampattern 802 generates directions of effective gain or attenuation. In this illustration, the dashed line indicates isometric lines of gain provided by the beamforming coefficients. For example, the gain at the dashed line here may be +12 decibels (dB) relative to an isotropic microphone.

The beampattern 802 may exhibit a plurality of lobes, or regions of gain, with gain predominating in a particular direction designated the beampattern direction 804. A main lobe 806 is shown here extending along the beampattern direction 804. A main lobe beam-width 808 is shown, indicating a maximum width of the main lobe 806. In this example, the beampattern 802 also includes side lobes 810, 812, 814, and 816. Opposite the main lobe 806 along the beampattern direction 804 is the back lobe 818.

Disposed around the beampattern 802 are null regions 820. These null regions are areas of attenuation to signals. In some examples, a user may resides within the main lobe 806 and benefit from the gain provided by the beampattern 802 and exhibit an improved SNR ratio compared to a signal acquired with non-beamforming. In contrast, if the user were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest. Beamforming may result in directional audio signal(s) that may then be processed by other components of the device 110 and/or system 100.

Figure 9A:
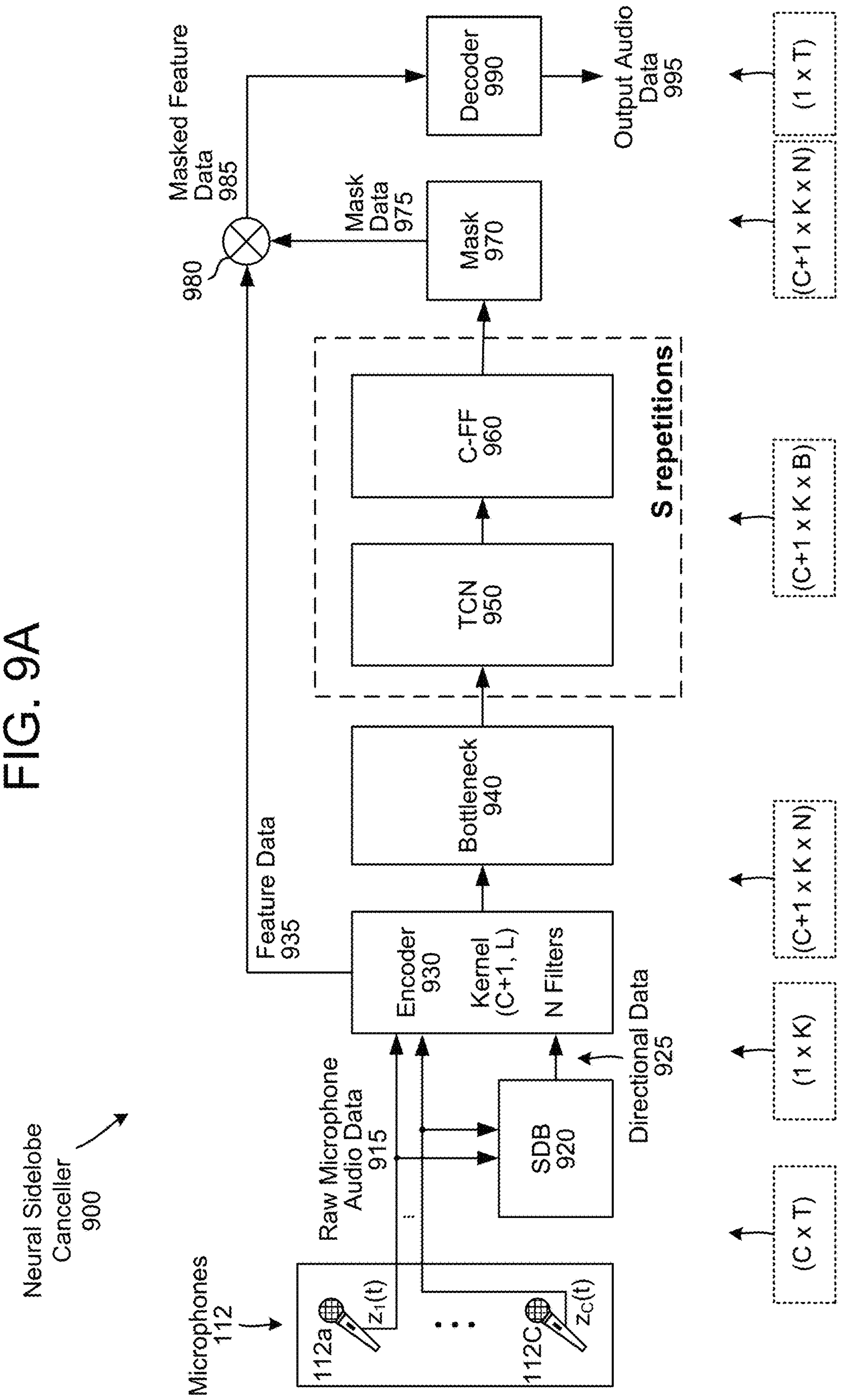
FIG. 9A illustrates an example component diagram for a neural sidelobe canceller according to embodiments of the present disclosure.

FIG. 9A illustrates an example component diagram for a neural sidelobe canceller according to embodiments of the present disclosure. As illustrated in FIG. 9A, two or more microphones 112 may generate raw microphone audio data 915 and may send the raw microphone audio data 915 to a fixed superdirective beamformer (SDB) component 920 and to an encoder component 930. For example, a first number of microphones (e.g., C microphones) may generate the raw microphone audio data 915. In some examples, the first number of microphones 112 may be equal to a total number of microphones 112 associated with the device 110. However, the disclosure is not limited thereto and in other examples the first number of microphones 112 may correspond to a portion of the total microphones 112 without departing from the disclosure. To illustrate an example, the first device 110*a* may include three microphones 112 and the neural sidelobe canceller 900 may receive raw microphone audio data 915 corresponding to either two microphones 112 or three microphones 112 without departing from the disclosure.

Additionally or alternatively, as the first device 110*a* and the second device 110*b* are connected via the first connection 124*a*, in some examples the neural sidelobe canceller 900 may receive raw microphone audio data 915 generated by first microphones 112*a* included in the first device 110*a* and second microphones 112*b* included in the second device 110*b*. For example, the neural sidelobe canceller 900 may receive raw microphone audio data 915 corresponding to four microphones 112 (e.g., two microphones 204*a*/205*a* from the first device 110*a* and two microphones 204*b*/205*b* from the second device 110*b*), six microphones 112 (e.g., three microphones 204*a*/205*a*/206*a* from the first device 110*a* and three microphones 204*b*/205*b*/206*b* from the second device 110*b*), and/or a combination thereof without departing from the disclosure.

The SDB component 920 may receive the raw microphone audio data 915 and process the raw microphone audio data 915 using a steering vector pointing to the desired enhancement direction. For example, the SDB component 920 may be a data-independent beamformer, with its beam pointing to the desired a look direction (e.g., particular azimuth direction and/or elevation), and the SDB component 920 may emphasize or boost audio from the desired look direction to generate directional data 925. In some examples, the SDB component 920 may be configured to enhance sources in front of the user 5, although the disclosure is not limited thereto and the desired look direction may vary without departing from the disclosure. In contrast to fixed beamformers that generate multiple beamformed output signals, the SDB component 920 generates directional data 925 that only corresponds to the look direction (e.g., first direction) and does not include additional beamformed outputs associated with non-target directions. To perform target speech separation, the neural sidelobe canceller 900 assumes that the exact position of the target is unknown but within a directional field of view (FOV) within +/−30° azimuth, and that there may be multiple concurrent targets with small azimuth difference.

In some examples, the SDB component 920 may be configured to enhance sources in front of the user 5, such that the desired a look direction (e.g., particular azimuth direction and/or elevation) is fixed at a first position relative to the user 5. Thus, the user 5 may select desired enhancement direction (e.g., select target speech) by physically moving the user's head, enabling the user 5 to distinguish between different speakers based on the physical orientation of the device 110. However, the disclosure is not limited thereto, and in other examples the device 110 may be configured to receive input data indicating the desired a look direction from the third device 122 and/or other devices without departing from the disclosure. For example, the third device 122 may include a user interface that enables the user 5 to dynamically select the desired a look direction. Thus, the user 5 may control the desired a look direction to select between different speakers without physically moving the user's head without departing from the disclosure.

The neural sidelobe canceller 900 uses the directional data 925 as directional cues to select between different speakers (e.g., users speaking, speech sources, etc.). For example, the encoder component 930 may receive the raw microphone audio data 915 and the directional data 925 and may combine the raw microphone audio data 915 and the directional data 925 to generate input signals for the separation stage. In some examples, the encoder component 930 may concatenate the directional data 925 to the raw microphone audio data 915 to generate the input signals, although the disclosure is not limited thereto.

As described above, the device 110 may include two or more microphones 112 and may generate the raw microphone audio data 915 using the first number of microphones to generate the first number of input signals (e.g., C input signals). For example, a first microphone 112*a* may generate first microphone audio data $z_1(t)$ in the time-domain, a second microphone may generate second microphone audio data $z_2(t)$ in the time-domain, and so on until the final microphone 112C may generate final microphone audio data $z_C(t)$. In some examples, a time-domain signal may be represented as microphone audio data z(t), which is comprised of a sequence of individual samples of audio data. Thus, z(t) denotes an individual sample that is associated with a time index t, where T is the total number of audio samples (e.g., total number of time indexes).

While the microphone audio data z(t) is comprised of a plurality of samples, in some examples the device 110 may group a plurality of samples and process them together. For example, the device 110 may group a number of samples together in a frame (e.g., audio frame) to generate microphone audio data z(n). Thus, z(n) corresponds to the time-domain signal and identifies an individual frame (e.g., fixed number of samples s) associated with a frame index k, where K is the total number of audio frames (e.g., total number of frame indexes).

In the example illustrated in FIG. 9A, the raw microphone audio data 915 corresponds to a first number of signals (e.g., C input signals) in the time domain that are associated with time indexes. Thus, the raw microphone audio data 915 may be represented as a two-dimensional array (C×T), with a first dimension (e.g., C) corresponding to the number of rows and indicating the first number of input signals (e.g., each row represents an individual input signal), and a second dimension (e.g., T) corresponding to the number of columns and indicating a total number of time indexes.

In contrast, the SDB component 920 may process the raw microphone audio data 915 using short frames and may represent the directional data 925 using frame indexes. For example, the SDB component 920 may process 40 audio samples per audio frame, which corresponds to 2.5 ms, although the disclosure is not limited thereto. Thus, the directional data 925 may be represented as a two-dimensional array (1×K), with a first dimension (e.g., 1) corresponding to a single row, and a second dimension (e.g., K) corresponding to the number of columns and indicating a total number of frame indexes.

The encoder component 930 may also process short frames of audio data and may therefore represent the combined input signals using frame indexes. For example, as the raw microphone audio data 915 corresponds to the first number of microphones (e.g., C input signals) and the directional data 925 corresponds to a single input signal, the encoder component 930 may represent the combined input signals as a two-dimensional array (C+1×K), with a first dimension (e.g., C+1) corresponding to a total number of rows, and a second dimension (e.g., K) corresponding to the number of columns and indicating the total number of frame indexes.

The encoder component 930 may be configured to transform the audio frames of the input signals into features for the separation stage. Unlike some multi-channel speech separation approaches, the encoder component 930 does not use spatial features such as normalized cross-correlation, inter-channel phase differences, and/or the like. Instead, the encoder component 930 is fully-trainable and configured to learn the optimal representation of the input signals and develop directional selectivity/blocking, while maintaining the small input frame size. As illustrated in FIG. 9A, the encoder component 930 may be implemented as a two-dimensional (2D) convolution, with a (C+1, L) kernel, where L=40 indicates that the audio frame includes 40 audio samples or time indexes (e.g., 2.5 ms audio frame), C+1 reflects that there are C input channels from the raw microphone audio data 915 and one input channel from the SDB component 920, and a stride of (L/2, 0) (e.g., 50% overlap between consecutive frames). The encoder component 930 may apply a first number of filters (e.g., N=512), and the output of the encoder component 930 may be followed by a Rectified Linear Unit (ReLU) activation layer. However, the examples described above are intended to conceptually illustrate an example and the disclosure is not limited thereto.

As the encoder component 930 applies the first number of filters using the (C+1, L) kernel, the encoder component 930 generates first feature data 935 that may represent the features as a three-dimensional array (C+1×K×N), with a first dimension (e.g., C+1) corresponding to a total number of rows (e.g., total number of input signals), a second dimension (e.g., K) corresponding to the number of columns and indicating the total number of frame indexes, and a third dimension (e.g., N) corresponding to a depth and indicating a total number of channels. Thus, the encoder component 930 may map a segment of the input signals to a high-dimensional representation that may be used by the separation stage to estimate mask data corresponding to the target speech. As the neural sidelobe canceller 900 uses an encoder-separation-decoder architecture, all of the components between the encoder component 930 and a decoder component 990 may be considered part of the separation stage.

The separation stage is configured to predict mask data 975 with which to apply to the output of the encoder component 930 (e.g., first feature data 935) to retrieve clean, anechoic target speech. Using the mask data 975, the neural sidelobe canceller 900 may generate the enhanced target speech signal while cancelling sidelobes, noise, and reverberation.

Inputs to the separation stage are processed through a bottleneck component 940, which may be configured to reduce the number of channels from a first number of channels (e.g., 512) to a second number of channels (e.g., 128). For example, the bottleneck component 940 may be implemented as a 1×1 pointwise convolutional block that is configured to remap N=512 to B=128 channels, although the disclosure is not limited thereto. Thus, the bottleneck component 940 may process the first feature data 935 to generate second feature data that may represent the features as a three-dimensional array (C+1×K×B), with the first dimension (e.g., C+1) and the second dimension (e.g., K) described above, and a third dimension (e.g., B) limiting a total number of channels processed by temporal convolutional network (TCN) blocks 950 and causal-fastformer (C-FF) blocks 960.

As illustrated in FIG. 9A, the separation stage may process the second feature data using a TCN block 950 followed by a C-FF block 960 a total of S repetitions. In some examples, the separation stage may process the second feature data a total of three times (e.g., S=3), although the disclosure is not limited thereto. For example, the neural sidelobe canceller 900 may process the second feature data by a first TNC block 950*a* and a first C-FF block 960*a*, followed by a second TNC block 950*b* and a second C-FF block 960*b*, followed by a third TNC block 950*c* and a third C-FF block 960*c*. Each TCN block 950 may be composed of X=8 dilated, causal 1D convolutions implemented as a depthwise separable convolution, as described in greater detail below with regard to FIGS. 10-11. In addition, each TCN block 950 is complemented with self-attention implemented as a causal version of a fastformer component (e.g., C-FF block 960), as described in greater detail below with regard to FIGS. 12-13.

Functionally, the C-FF block 960 is analogous to dot-product attention, but its frame-wise computational complexity is independent of the sequence length. This property is particular desirable for a low-latency use case with a large number of small frames (K) in the sequence. The causality of the C-FF is achieved by selectively masking the input, so that that module integrates only a most recent 200 frames (e.g., 250 ms) to compute its output at a given time step. The motivation for using such short-sighted self-attention is to reinforce local consistency of speech, which may be disrupted by the long-range relations captured in the TCN blocks 950. The addition of the C-FF blocks 960 does not greatly increase a model size or computational complexity for the neural sidelobe canceller 900, because all transformations performed in the C-FF block 960 are implemented as fully-connected layers and the only other trainable parameter is W (size d).

A single C-FF block 960 follows each TCN block 950 in the separation stage. For example, as the neural sidelobe canceller 900 processes the second feature data using three TCN blocks 950*a*-950*c*, the neural sidelobe canceller 900 also includes three C-FF blocks 960*a*-960*c*. After processing the second feature data using all three TCN blocks 950*a*-950*c* and all three C-FF blocks 960*a*-960*c* to generate third feature data, a mask component 970 may process the third feature data to generate mask data 975. For example, the mask component 970 may receive the third feature data output by the third C-FF block 960*c* and may process the third feature data using a Parametric Rectified Linear Unit (e.g., PReLU) activation layer, a 1×1 pointwise convolutional block that is configured to increase the number of channels, and a Rectified Linear Unit (ReLU) activation layer.

The ReLU activation layer may be represented as:

$$ReLU(x) = \begin{cases} x, & \text{if } x \geq 0 \\ 0 & \text{otherwise} \end{cases} \quad [14]$$

Such that negative values are ignored and only the positive part of the feature data is passed. Similarly, the PReLU activation layer may be represented as:

$$PReLU(x) = \begin{cases} x, & \text{if } x \geq 0 \\ \alpha x & \text{otherwise} \end{cases} \quad [15]$$

where α is a trainable scalar controlling the negative slope of the rectifier. Thus, while the RELU activation layer ignores negative values by setting them equal to zero, the PReLU activation layer allows a small gradient when the unit is not active and makes a coefficient of leakage into a parameter that is learned during training.

While the bottleneck component 940 may be configured to reduce the number of channels (e.g., remap N=512 to B=128 channels), the 1×1 pointwise convolutional block included in the mask component 970 may be configured to increase the number of channels back to the number of filters included in the encoder component 930 and/or the decoder component 990. For example, the 1×1 pointwise convolutional block may remap B=128 to N=512 channels, although the disclosure is not limited thereto. Thus, the mask component 970 may process the third feature data to generate the mask data 975, which may represent the features as a three-dimensional array (C+1×K×N).

After generating the mask data 975, the neural sidelobe canceller 900 may apply the mask to the first feature data 935 to generate masked feature data 985, which is a feature representation of the target speech. For example, a combiner component 980 may multiply the first feature data 935 by the mask data 975 to identify portions of the first feature data 935 that correspond to the target speech and remove portions of the first feature data 935 that correspond to non-target speech, acoustic noise, and/or the like. Thus, the masked feature data 985 includes the first number of channels (e.g., N=512), with nonzero portions of the masked feature data 985 representing the target speech (e.g., based on a corresponding filter of the N filters).

The decoder component 990 may receive the masked feature data 985 and may reconstruct frames of the masked encoder output back to the time domain. For example, the decoder component 990 may perform a transpose 1D convolution to generate reconstructed frames and then may perform an overlap and add operation using the reconstructed frames to generate output audio data 995 representing the target speech. The output audio data 995 may be anechoic, with sidelobes, noise, and reverberation cancelled.

The objective of training the end-to-end system is maximizing the scale-invariant source-to-noise ratio (SI-SNR), which is defined as:

$$\begin{cases} s_{target} := \frac{\langle \hat{s} s \rangle s}{\|s\|^2} \\ e_{noise} := \hat{s} - s_{target} \\ SI-SNR := 10\log_{10}\frac{\|s_{target}\|^2}{\|e_{noise}\|^2} \end{cases} \quad [16]$$

where $\hat{s}\in\mathbb{R}^{1xT}$ and $s\in\mathbb{R}^{1xT}$ re the estimated and original clean sources, respectively, and $\|s\|^2=\langle \hat{s}, s\rangle$ denotes the signal power. Scale invariance is ensured by normalizing ŝ and s to zero-mean prior to the calculation. In some examples, utterance-level permutation invariant training (uPIT) may be applied during training to address the source permutation problem.

Thus, the neural sidelobe canceller 900 may train the end-to-end system using gated SI-SNR–$L_1$ loss defined as:

$$L_{gated} = \begin{cases} L_1(\hat{s}, s) & n_{target} = 0 \\ SI-SNR(\hat{s}, s) + \alpha L_1(\hat{s}, s) & n_{target} > 0 \end{cases} \quad [17]$$

where s corresponds to the anechoic target speech, ŝ represents model output, and α is a constant used to balance magnitudes of the two components of the gated loss (e.g., α=100, although the disclosure is not limited thereto). Such defined loss allows the neural sidelobe canceller 900 to handle cases in which there is no target talker to reconstruct ($n_{target}$=0). While the loss function above illustrates an example in which the system is trained to maximize the SI-SNR, the disclosure is not limited thereto and the loss function may maximize other parameters, such as a source-to-distortion ratio (SDR) and/or the like, without departing from the disclosure.

Various machine learning techniques may be used to train the neural sidelobe canceller 900 without departing from the disclosure. Models may be trained and operated according to various machine learning techniques. Such techniques may include, for example, neural networks (such as deep neural networks and/or recurrent neural networks), inference engines, trained classifiers, etc. Examples of trained classifiers include conditional random fields (CRF) classifiers, Support Vector Machines (SVMs), neural networks, decision trees, AdaBoost (short for "Adaptive Boosting") combined with decision trees, and random forests.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the model(s) discussed herein. Further, as training data is added to, or otherwise changed, new models may be trained to update the models without departing from the disclosure.

Figure 9B:
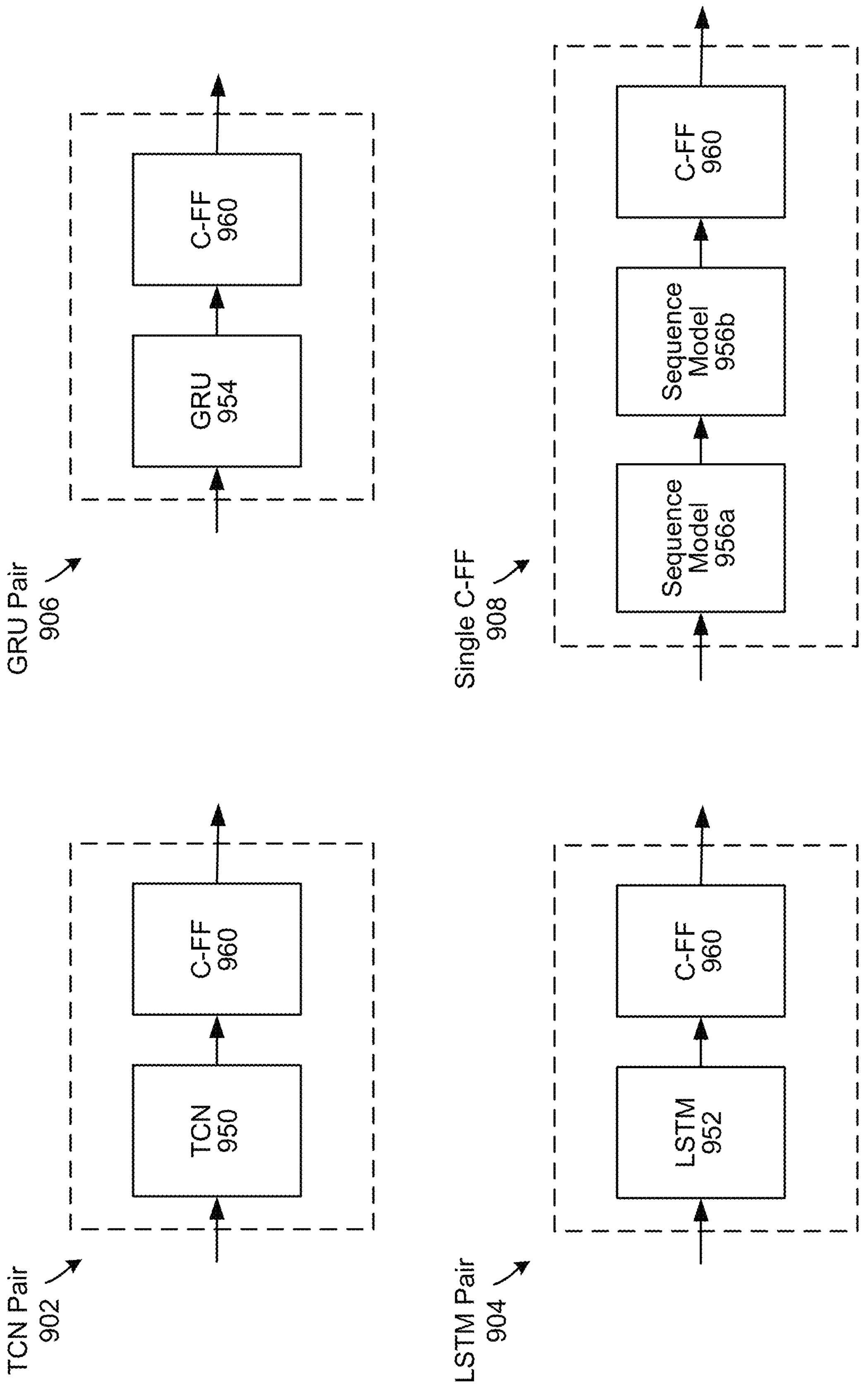
FIG. 9B illustrates example component diagrams for alternative implementations of the neural sidelobe canceller according to embodiments of the present disclosure.

FIG. 9B illustrates example component diagrams for alternative implementations of the neural sidelobe canceller according to embodiments of the present disclosure. While FIG. 9A illustrates an example of the neural sidelobe canceller 900 that includes the TCN block 950, the disclosure is not limited thereto and the device 110 may include other sequence models without departing from the disclosure. For example, the neural sidelobe canceller 900 may include the TCN block 950, a long short-term memory (LSTM) block 952, a gated recurrent unit (GRU) block 954, and/or other sequence models without departing from the disclosure.

As illustrated in FIG. 9B, in some examples the separation stage may process the second feature data using a TCN pair 902, which includes the TCN block 950 followed by the C-FF block 960, as described above with regard to FIG. 9A. In other examples, the separation stage may process the second feature data using a LSTM pair 904, which includes the LSTM block 952 followed by the C-FF block 960, without departing from the disclosure. Finally, in some examples the separation stage may process the second feature data using a GRU pair 906, which includes the GRU block 954 followed by the C-FF block 960, without departing from the disclosure. Regardless of which sequence model pairing is chosen for the separation stage, the neural sidelobe canceller 900 may repeat the processing a total of S repetitions without departing from the disclosure. Thus, while FIG. 9B only illustrates a single sequence model, the neural sidelobe canceller 900 may process the second feature data multiple times using the chosen sequence model pairing (e.g., TCN pair 902, LSTM pair 904, or GRU pair 906) without departing from the disclosure.

Additionally or alternatively, the neural sidelobe canceller 900 may include only a single C-FF block 960 without departing from the disclosure. As illustrated in FIG. 9B, a single C-FF example 908 may include multiple sequence model blocks 956 followed by a single C-FF block 960. The sequence block 956 may correspond to any one of the TCN block 950, the LSTM block 952, the GRU block 954, and/or the like without departing from the disclosure. While FIG. 9B illustrates an example of two sequence model blocks 956*a*/956*b*, this is intended to conceptually illustrate a simple example and the disclosure is not limited thereto. Instead, the neural sidelobe canceller 900 may include any number of sequence model blocks in the separation stage prior to the C-FF block 960 without departing from the disclosure. Thus, a single C-FF block 960 may be effective as a last block before the separation stage outputs to the mask component 970.

Figure 10:
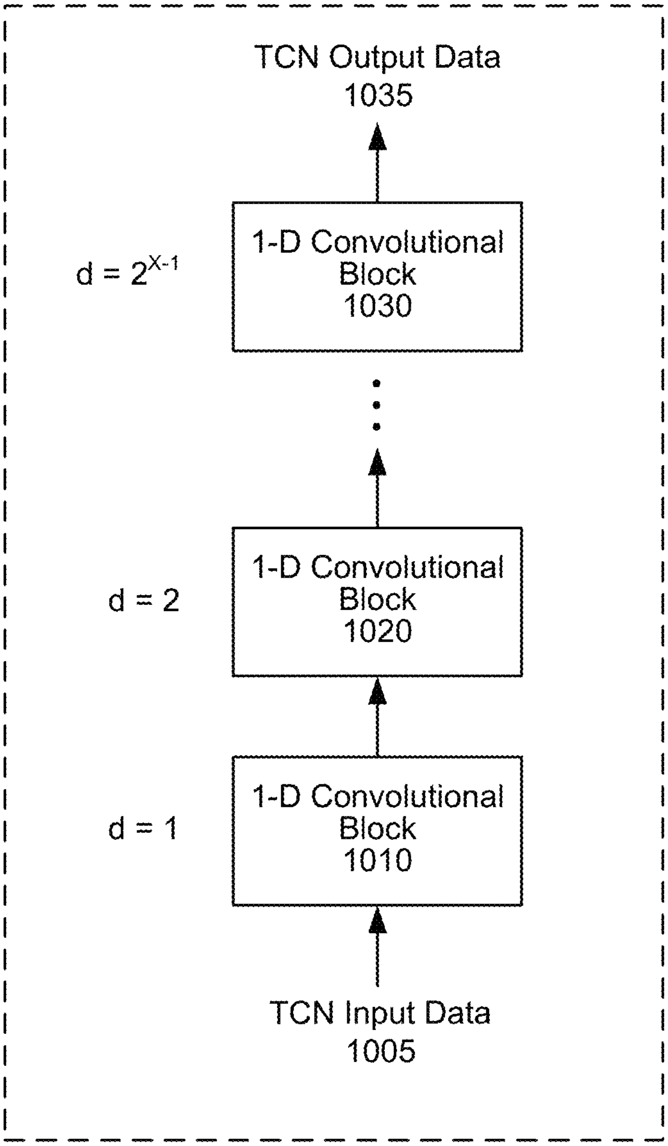
FIG. 10 illustrates an example component diagram for a temporal convolutional network according to embodiments of the present disclosure.

FIG. 10 illustrates an example component diagram for a temporal convolutional network according to embodiments of the present disclosure. As illustrated in FIG. 10, a temporal convolutional network (TCN) block 950 may include a series of 1-D convolutional blocks that are configured to collectively receive TCN input data 1005 and generate TCN output data 1035. The series of 1-D convolutional blocks are stacked, with each successive block processing an output of a previous block, such that the series of 1-D convolutional blocks iteratively process the TCN input data 1005 a fixed number of times (e.g., X convolutional blocks correspond to X iterations).

The TCN block 950 is composed of X dilated, causal 1D convolutions implemented as depthwise separable convolution. As illustrated in FIG. 10, a first 1-D convolutional block 1010 may receive the TCN input data 1005 and generate first data, a second 1-D convolutional block 1020 may receive the first data and generate second data, and so on until a final (e.g., X-th) 1-D convolutional block 1030 may receive the (X−1) data and generate the TCN output data 1035. As the TCN block 950 is composed of dilated convolutional blocks, each layer in the TCN block 950 consists of 1-D convolutional blocks with increasing dilation factors. The dilation factors increase exponentially to ensure a sufficiently large temporal context window to take advantage of the long-range dependencies of the speech signal. Thus, the X convolutional blocks have dilation factors $\langle 1, 2, 4, \ldots, 2^{X-1} \rangle$.

In some examples, the TCN block 950 may comprise eight 1-D convolutional blocks (e.g., X=8), such that the final (e.g., eighth) 1-D convolutional block 1030 receives seventh data and has a dilation factor of 128 (e.g., $2^{8-1}=2^7=128$), although the disclosure is not limited thereto. The input to each block is zero padded accordingly to ensure that the output length is the same as the input length (e.g., the output data has the same dimensions as the input data). An architecture for each of the 1-D convolutional blocks included in the TCN block 950 is illustrated in FIG. 11.

Figure 11:
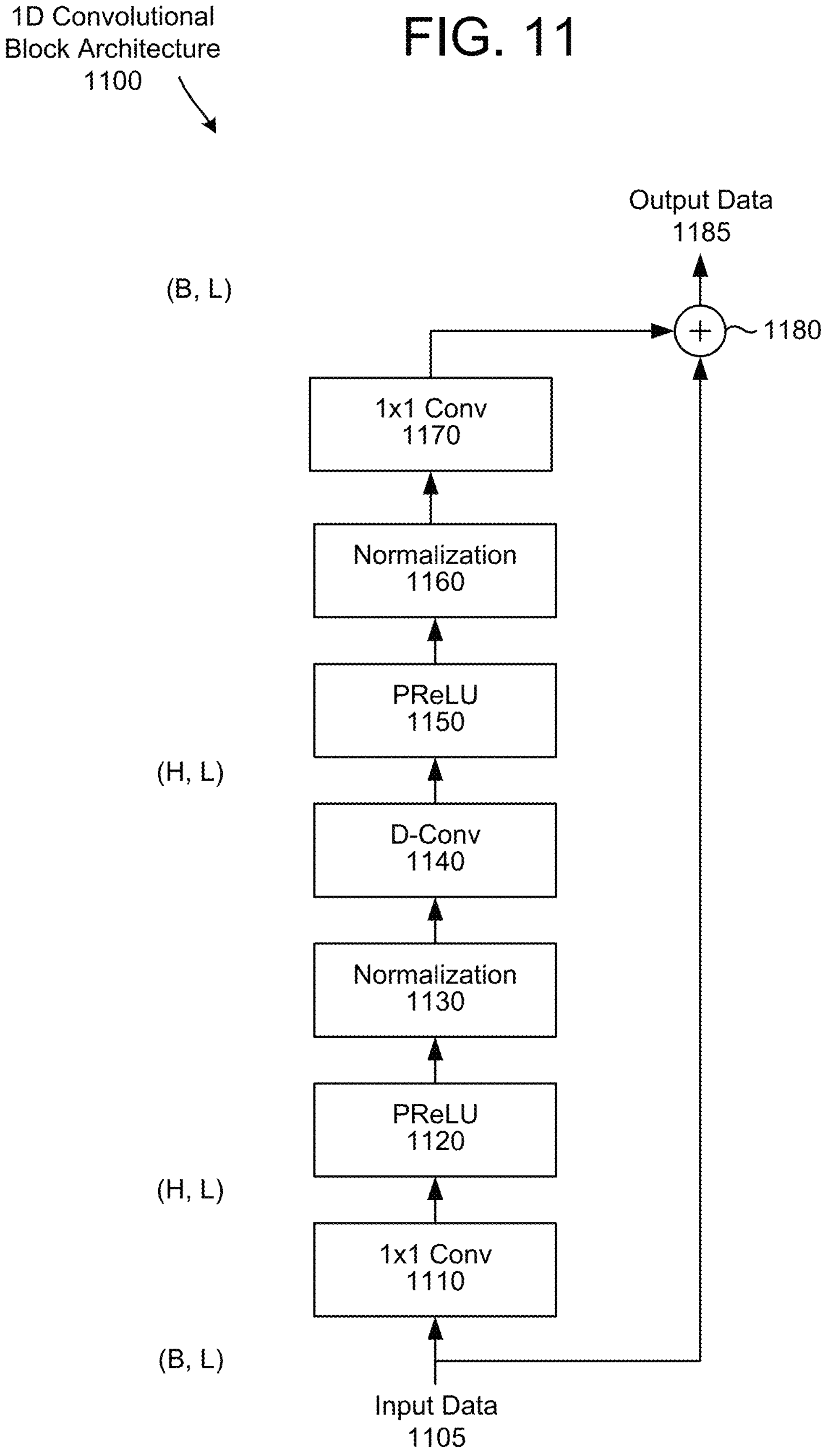
FIG. 11 illustrates an example component diagram for a 1D convolutional block according to embodiments of the present disclosure.

FIG. 11 illustrates an example component diagram for a 1D convolutional block according to embodiments of the present disclosure. As illustrated in FIG. 11, 1D convolutional block architecture 1100 includes a series of convolutional blocks, with an activation layer and a normalization layer between each two convolution operations. Using this series of convolutional blocks, the 1D convolutional block architecture 1100 may receive input data 1105 and generate output data 1185.

As illustrated in FIG. 11, the 1D convolutional block architecture 1100 may include a 1×1 convolutional block 1110, a first activation layer (e.g., PReLU) 1120, a first normalization layer 1130, a depthwise convolutional (D-conv) block 1140, a second activation layer (e.g., PReLU) 1150, a second normalization layer 1160, a 1×1 convolutional block 1170, and a combiner 1180. Thus, the series of convolutional blocks process the input data 1105 to generate an output of the 1×1 convolutional block 1170 and the combiner 1180 is configured to add this output to the input data 1105 to generate the output data 1185. The residual path (e.g., output path) serves as input to the next convolutional block in the TCN block 950.

As described above, the bottleneck component 940 reduces the number of channels for the TCN block 950 by remapping from N channels to B channels (e.g., remapping from N=512 to B=128, although the disclosure is not limited thereto). Thus, the bottleneck component 940 determines the number of channels (e.g., B channels) in the input and residual path of each 1-D convolutional block. For example, for a 1-D convolutional block with H channels and kernel size P, the size of the kernel in the 1×1 convolutional block 1110 and the depthwise convolutional (D-conv) block 1140 should be $O \in \mathbb{R}^{B \times H \times 1}$ and $K \in \mathbb{R}^{H \times P}$, respectively, and the size of the kernel in the residual path should be $L \in \mathbb{R}^{H \times B \times 1}$.

As described above, the C-FF block 960 improves upon previous attention models at least by adding causality. For example, the causality of the C-FF block 960 is achieved by selectively masking the input, so that that the C-FF block 960 integrates only a most recent 200 frames (e.g., 250 ms) to compute its output at a given time step. To properly describe the layers and functionality of the C-FF block 960, the following description refers to two previous iterations of the attention model (e.g., a transformer model and a fastformer model).

A first iteration of the attention model (e.g., transformer model) was built upon self-attention, which can effectively model the contexts within a sequence by capturing the interactions between inputs at each pair of positions. For example, self-attention calculates a weighted average of feature representations with the weight proportional to a similarity score between pairs of representations. Formally, an input sequence $X \in \mathbb{R}^{N \times d}$ of sequence length N and a depth d (e.g., N tokens of dimensions d), is projected using three matrices $W_Q \in \mathbb{R}^{d \times d}$, $W_K \in \mathbb{R}^{d \times d}$ and $W_V \in \mathbb{R}^{d \times d}$ to extract feature representations Q, K, and V. These feature representations are referred to as queries (e.g., query matrix), keys (e.g., key matrix), and values (e.g., value matrix), and the outputs Q, K, V are computed as:

$$Q=XW_Q,\ K=XW_K,\ V=XW_V. \qquad [18]$$

where $W_Q$, $W_K$, and $W_V$ are learnable parameters that represent linear transformation parameter matrices. Thus, self-attention can be written as:

$$S = D(Q, K, V) = \mathrm{softmax}\left(\frac{QK^T}{\sqrt{d}}\right)V \qquad [19]$$

where softmax denotes a row-wise softmax normalization function (e.g., softmax function is applied row-wise to $QK^T$). Thus, each element in S depends on all other elements in the same row.

Equation [19] implements a specific form of self-attention called softmax attention, where the similarity score is an exponential of the dot product between a query matrix and a key matrix. Given that subscripting a matrix with i returns the i-th row as a vector, a generalized attention equation for any similarity function can be written as:

$$S_i = \frac{\sum_{j=1}^{N} \text{sim}(Q_i, K_i) V_i}{\sum_{j=1}^{N} \text{sim}(Q_i, K_i)} \quad [20]$$

Equation [20] is equivalent to Equation [19] if the system substitutes the similarity function with $$\text{sim}(q, k) = \exp\left(\frac{q^T k}{\sqrt{d}}\right).$$

Thus, the transformer model processed three inputs (e.g., a query matrix, a key matrix, and a value matrix) using a sequence length N and a depth d (e.g., hidden dimension in each attention head). However, the computational complexity of the transformer model was quadratic to the sequence length N, which results in extreme inefficiency for long sequences.

A second iteration of the attention model (e.g., fastformer model) uses additive attention to model global contexts and uses element-wise product to model the interaction between each input representation and global contexts, which can greatly reduce the computational cost and still effectively capture contextual information. For example, the fastformer model uses additive attention mechanism to summarize the query sequence into a global query vector, then models the interaction between the global query vector and attention keys with element-wise product and summarize keys into a global key vector via additive attention. The fastformer model then models the interactions between global key and attention values via element-wise product, uses a linear transformation to learn global context-aware attention values, and finally adds them with the attention query to form the final output. Thus, the computational complexity can be reduced to linearity, and the contextual information in the input sequence can be effectively captured.

The fastformer model first transforms the input embedding matrix into the query, key, and value sequences. The input matrix is denoted as $X \in \mathbb{R}^{N \times d}$, where N is the sequence length and dis the hidden dimension. Its subordinate vectors are denoted as $[x_1, x_2, \ldots, x_N]$. Following the transformer model, in each attention head there are three independent linear transformation layers to transform the input matrix into a query matrix, a key matrix, and a value matrix, which are written as $Q=[q_1, q_2, \ldots, q_N]$, $K=[k_1, k_2, \ldots, k_N]$, and $V=[V_1, V_2, \ldots, V_N]$, respectively. However, modeling the contextual information of the input sequence based on the interactions among these three matrixes is computational prohibitive (e.g., its quadratic complexity makes it inefficient in long sequence modeling), so the fastformer model reduces computational complexity by summarizing the attention matrixes (e.g., query) before modeling their interactions. Additive attention is a form of attention mechanism that can efficiently summarize important information within a sequence in linear complexity. Thus, the fastformer model uses additive attention to summarize the query matrix into a global query vector $q \in \mathbb{R}^d$, which condenses the global contextual information in the attention query. More specifically, the attention weight $\alpha_i$ of the i-th query vector is computed as follows:

$$\alpha_i = \frac{\exp\left(\frac{w_q^T q_i}{\sqrt{d}}\right)}{\sum_{j=1}^{N} \exp\left(\frac{w_q^T q_j}{\sqrt{d}}\right)} \quad [21]$$

where $w_q$ is a learnable parameter vector. The global attention query vector is computed as follows:

$$q = \sum_{i=1}^{N} \alpha_i q_i \quad [22]$$

In addition, the fastformer model uses the element-wise product between the global query vector and each key vector to model their interactions and combine them into a global context-aware key matrix. Thus, the i-th vector in this matrix is $p_i$, which is formulated as $p_i = q * k_i$, where * denotes an element-wise product. In a similar manner, the additive attention mechanism is used to summarize the global context-aware key matrix, such that the additive attention weight of its i-th vector is computed as:

$$\beta_i = \frac{\exp\left(\frac{w_k^T p_i}{\sqrt{d}}\right)}{\sum_{j=1}^{N} \exp\left(\frac{w_k^T p_j}{\sqrt{d}}\right)} \quad [23]$$

where $W_k$ is the attention parameter vector. The global key vector $k \in \mathbb{R}^d$ is computed as follows:

$$k = \sum_{i=1}^{N} \beta_i p_i \quad [24]$$

Finally, the fastformer model attempts to model the interaction between attention value matrix and the global key vector for better context modeling. Similar to the query-key interaction modeling, the fastformer model performs an element-wise product between the global key and each value vector to compute a key-value interaction vector $u_i$, which is formulated as $u_i = k * v_i$. The fastformer model also applies a linear transformation layer to each key-value interaction vector to learn its hidden representation. The output matrix from this layer is denoted as $R=[r_1, r_2, \ldots, r_N] \in \mathbb{R}^{N \times d}$. This matrix is further added together with the query matrix to form the final output of the fastformer model.

Figure 12:
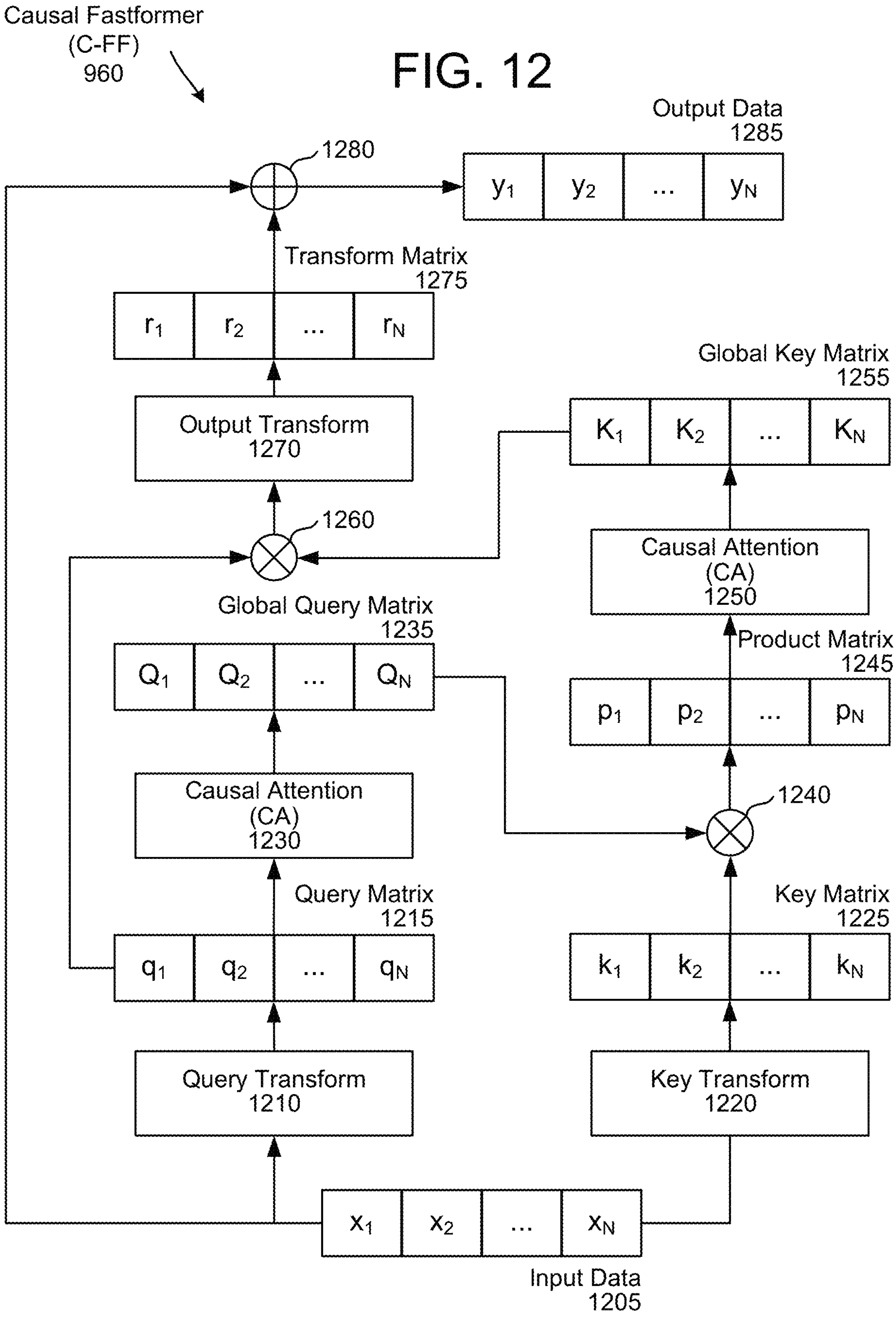
FIG. 12 illustrates an example component diagram for a causal fastformer block according to embodiments of the present disclosure.

FIG. 12 illustrates an example component diagram for a causal fastformer block according to embodiments of the present disclosure. To reduce memory cost, the C-FF block 960 may share the query and value transformation parameters and may share parameters across different layers to further reduce the parameter size and mitigate the risk of overfitting. Thus, the C-FF block 960 uses the same values between the query transformation parameters (e.g., learnable parameters $W_Q$) and the value transformation parameters (e.g., learnable parameters $W_V$), such that the value matrix is equal to the query matrix $[q_1, q_2, \ldots, q_N]=[V_1, V_2, \ldots, V_N]$. As a result, any reference to the value matrix in the fastformer model may instead refer to the query matrix when applied to the C-FF block 960.

In addition, the C-FF block 960 can be made causal by masking the attention computation such that the i-th position can only be influenced by a position j if and only if $j \leq i$;

namely a position cannot be influenced by subsequent positions. As a result of the causal masking, along with sharing the same values between the query transformation parameters and the value transformation parameters, Equation [20] can be rewritten as follows:

$$S_i = \frac{\sum_{j=1}^{i} \text{sim}(Q_i, K_j) Q_j}{\sum_{j=1}^{i} \text{sim}(Q_i, K_j)} \quad [25]$$

As illustrated in FIG. 12, input data 1205 is denoted as $[x_1, x_2, \ldots, x_N]$. The C-FF block 960 may include two independent linear transformation layers configured to transform the input matrix into a query matrix and a key matrix. For example, a query transform layer 1210 may apply a first linear transformation to the input data 1205 to generate the query matrix 1215, denoted as $[q_1, q_2, \ldots, q_N]$. Similarly, a key transform layer 1220 may apply a second linear transformation to the input data 1205 to generate the key matrix 1225, denoted as $[k_1, k_2, \ldots, k_N]$. As discussed above, the C-FF block 960 shares the same values between the query transformation parameters and the value transformation parameters, so the value matrix is equivalent to the query matrix 1215.

As described above with regard to the fastformer, additive attention is a form of attention mechanism that can efficiently summarize important information within a sequence in linear complexity. Thus, the fastformer model uses additive attention to summarize the query matrix into a global query vector $q \in \mathbb{R}^d$, which condenses the global contextual information in the attention query. Similarly, the fastformer model determines the element-wise product between the global query vector and each key vector and then uses additive attention to summarize the key matrix into a global key vector $k \in \mathbb{R}^d$.

The C-FF block 960 operates in a similar manner, except that the C-FF block 960 generates the global query matrix 1235 and the global key matrix 1255 by applying causal attention (CA) layers 1230/1250, which will be described in greater detail below with regard to FIG. 13. As illustrated in FIG. 12, the C-FF block 960 may process the query matrix 1215 using a first CA layer 1230 to generate the global query matrix 1235, denoted as $[Q_1, Q_2, \ldots, Q_N]$.

The C-FF block 960 may include a first combiner 1240 configured to perform an element-wise product between the global query matrix 1235 and the key matrix 1225 to generate a first product matrix 1245, denoted as $[P_1, P_2, \ldots, P_N]$. The C-FF block 960 may process the product matrix 1245 using a second CA layer 1250 to generate the global key matrix 1255, denoted as $[K_1, K_2, \ldots, K_N]$.

The C-FF block 960 may include a second combiner 1260 configured to perform an element-wise product between the global key matrix 1255 and the query matrix 1215 (e.g., in place of the value vector) to generate a second product matrix (not illustrated). The C-FF block 960 also includes an output transform layer 1270 configured to perform a linear transformation to the second product matrix to learn its hidden representation and generate a transform matrix 1275, denoted as $R=[r_1, r_2, \ldots, r_N]$. Finally, a summing layer 1280 is configured to add the transform matrix 1275 to the input data 1205 to form the output data 1285 of the C-FF block 960, denoted as $[y_1, y_2, \ldots, y_N]$.

As described above, the causal fastformer (C-FF) block 960 is analogous to dot-product attention, but its frame-wise computational complexity is independent of the sequence length. This property is particular desirable for a low-latency use case with a large number of small frames (K) in the sequence. The causality of the C-FF is achieved by selectively masking the input, so that that module integrates only a most recent 200 frames (e.g., 250 ms) to compute its output at a given time step. The motivation for using such short-sighted self-attention is to reinforce local consistency of speech, which may be disrupted by the long-range relations captured in the TCN blocks 950. The addition of the C-FF blocks 960 does not greatly increase a model size or computational complexity for the neural sidelobe canceller 900, because all transformations performed in the C-FF block 960 are implemented as fully-connected layers and the only other trainable parameter is W (size d).

Figure 13:
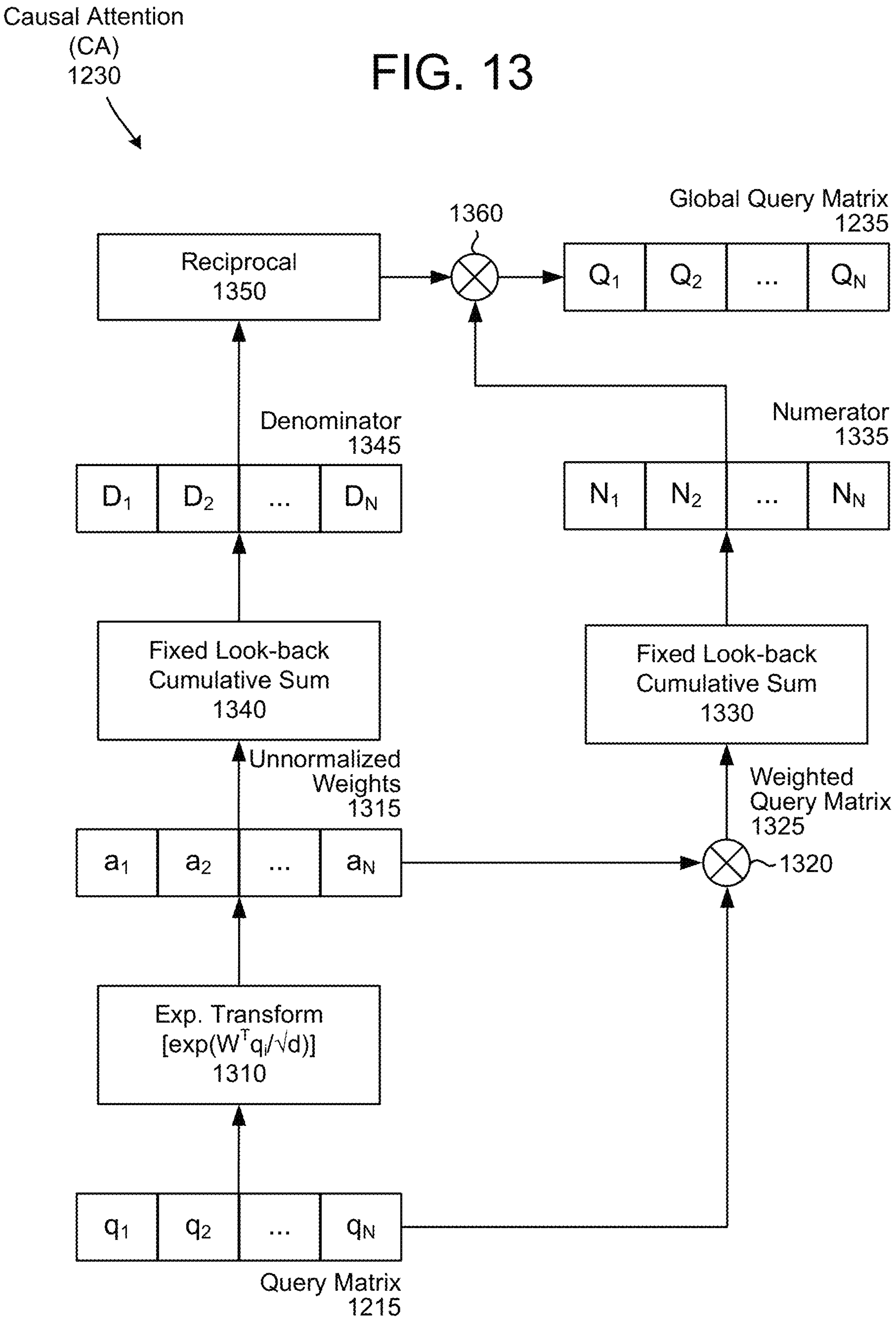
FIG. 13 illustrates an example component diagram for a causal attention block according to embodiments of the present disclosure.

FIG. 13 illustrates an example component diagram for a causal attention (CA) block according to embodiments of the present disclosure. As illustrated in FIG. 13, the first CA layer 1230 may receive the query matrix 1215 as an input and may process the query matrix 1215 using an exponential transform (Exp. Transform) layer 1310 to generate unnormalized weights 1315 (e.g., unnormalized weights matrix). For example, the exponential transform layer 1310 may apply a function (e.g., exp $$\left(\frac{w_q^T q_i}{\sqrt{d}}\right)$$

to generate the unnormalized weights 1315, although the disclosure is not limited thereto.

The first CA layer 1230 may include a first combiner 1320 configured to combine the unnormalized weights 1315 and the query matrix 1215 to generate a weighted query matrix 1325. For example, the first combiner 1320 may perform an element-wise product between the unnormalized weights 1315 and the query matrix 1215, although the disclosure is not limited thereto.

The first CA layer 1230 includes a first fixed look-back cumulative sum block 1330 configured to process the weighted query matrix 1325 to generate a numerator 1335, denoted as $[N_1, N_2, \ldots, N_N]$. For example, the first fixed look-back cumulative sum block 1330 may be configured to integrate the most recent 200 frames (e.g., 250 ms) of the weighted query matrix 1325 to compute the numerator 1335. Similarly, the first CA layer 1230 includes a second fixed look-back cumulative sum block 1340 configured to process the unnormalized weights 1315 to generate a denominator 1345, denoted as $[D_1, D_2, \ldots, D_N]$. For example, the second fixed look-back cumulative sum block 1340 may be configured to integrate the most recent 200 frames (e.g., 250 ms) of the unnormalized weights 1315 to compute the denominator 1345.

Finally, a reciprocal layer 1350 may determine a reciprocal of the denominator 1345 and the first CA layer 1230 may include a second combiner 1360 configured to combine the numerator 1335 and the reciprocal of the denominator 1345 to generate a global query matrix 1235. For example, the first combiner 1320 may perform an element-wise product between the numerator 1335 and the reciprocal of the denominator 1345, although the disclosure is not limited thereto. The overall processing performed by the first CA layer 1230 corresponds to the causal attention equation, and may be expressed as:

$$S_i = \frac{\sum_{j=1}^{i} \exp\left(\frac{w_q^T q_i}{\sqrt{d}}\right) q_j}{\sum_{j=1}^{i} \exp\left(\frac{w_q^T q_i}{\sqrt{d}}\right)} \quad [26]$$

While FIG. 13 illustrates an example of processing performed by the first CA layer 1230, this is intended to conceptually illustrate a single example and the disclosure is not limited thereto. Thus, the processing illustrated in FIG. 13 can be extended to the second CA layer 1250 in order to perform the functionality associated with the second CA layer 1250. For example, while FIG. 13 illustrates the first CA layer 1230 processing the query matrix 1215 to generate the global query matrix 1235, the same processing may be performed by the second CA layer 1250 to the product matrix 1245 to generate the global key matrix 1255 without departing from the disclosure.

Figure 14:
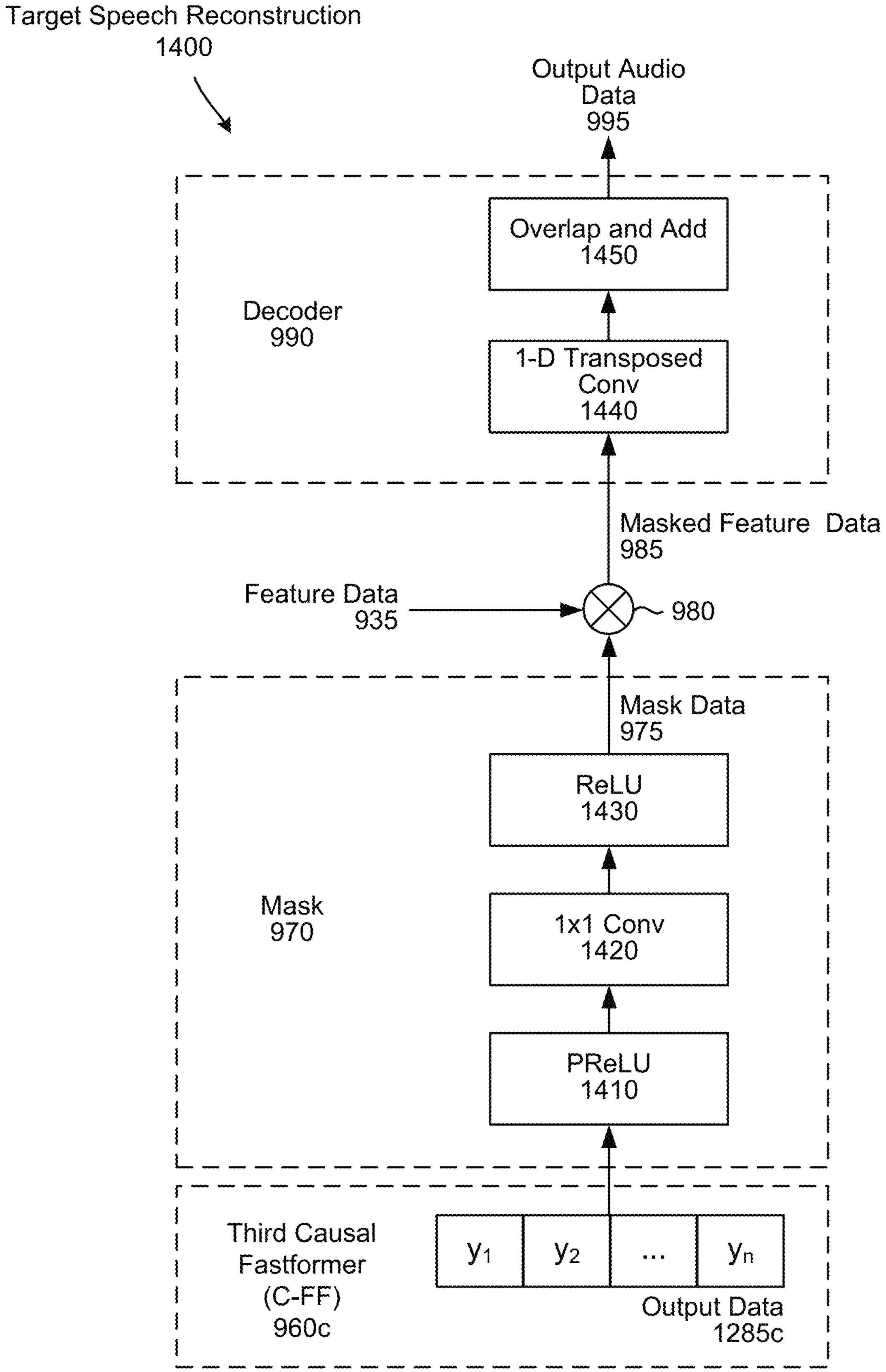
FIG. 14 illustrates an example component diagram for target speech reconstruction according to embodiments of the present disclosure.

FIG. 14 illustrates an example component diagram for target speech reconstruction according to embodiments of the present disclosure. After the neural sidelobe canceller 900 processes the second feature data using the TCN blocks 950*a*-950*c* and the C-FF blocks 960*a*-960*c* a total of three times, the third C-FF block 960*c* may output the third feature data (e.g., third output data 1285*c*) to the mask component 970.

FIG. 14 illustrates example components configured to preform target speech reconstruction 1400. As illustrated in FIG. 14, the mask component 970 may receive the third feature data output by the third C-FF block 960*c* and may process the third feature data using a Parametric Rectified Linear Unit (e.g., PReLU) activation layer 1410, a 1×1 pointwise convolutional block 1420 that is configured to increase the number of channels, and a Rectified Linear Unit (ReLU) activation layer 1430. For example, the 1×1 pointwise convolutional block 1420 may be configured to remap B=128 to N=512 channels, although the disclosure is not limited thereto. Thus, the ReLU activation layer 1430 may output the mask data 975 having the same dimensions as the first feature data 935 (C+1×K×N).

A combiner 980 may combine the first feature data 935 and the mask data 975 to generate masked feature data 985 (e.g., masked encoder output) that represents enhanced target speech. In some examples, the combiner 980 masks the first feature data 935 based on the values represented in the mask data 975. For example, the mask data 975 may have the constraint that $m \in [0,1]$, such that a first value (e.g., m=1) in the mask data 975 passes a corresponding portion of the first feature data 935, a second value (e.g., m=0) in the mask data 975 blocks a corresponding portion of the first feature data 935, and a third value between the second value and the first value (e.g., 0<m<1) in the mask data 975 attenuates a corresponding portion of the first feature data 935 based on the third value.

The decoder component 990 may receive the masked feature data 985 and may include a 1-D transposed convolutional block 1440 and an overlap and add block 1450 that are collectively configured to process the masked feature data 985 to generate the output audio data 995. Thus, the decoder component 990 may reconstruct frames of the masked encoder output back to the time domain and the reconstructed frames may be overlapped and added to obtain the separated target speech stream with sidelobes, noise, and reverberation cancelled. In some examples, the 1-D transposed convolutional block 1440 may be configured to receive the masked feature data 985 having first dimensions (C+1×K×N) and may generate reconstructed output data having second dimensions (K×L×1). The overlap and add block 1450 may then be configured to process the reconstructed output data to generate the output audio data 995 having third dimensions (1×T×1), although the disclosure is not limited thereto.

Figure 15:
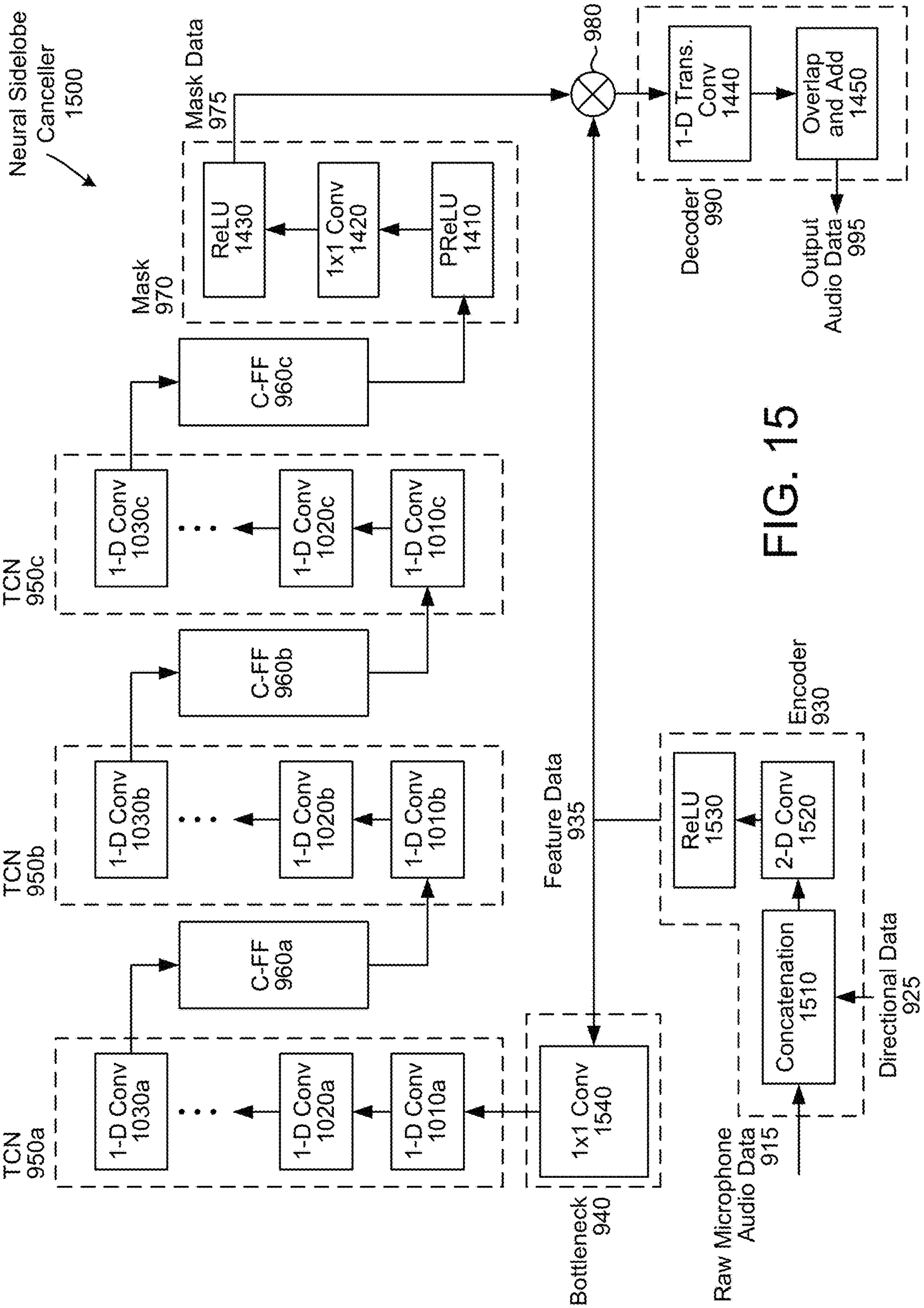
FIG. 15 illustrates an example component diagram for a neural sidelobe canceller according to embodiments of the present disclosure.

FIG. 15 illustrates an example component diagram for a neural sidelobe canceller according to embodiments of the present disclosure. While FIG. 15 illustrates an example of a neural sidelobe canceller 1500, this example is intended to conceptually illustrate a single example and the disclosure is not limited thereto. Thus, the individual layers included in each of the processing blocks (e.g., encoder component 930, bottleneck component 940, TCN blocks 950, C-FF blocks 960, mask component 970, and/or decoder component 990) may vary from the example illustrated in FIG. 15 without departing from the disclosure.

As most of the components illustrated in FIG. 15 were described above with regard to previous drawings, a redundant description is omitted. Thus, while FIG. 15 depicts a detailed illustration of a specific implementation, the only new blocks illustrated are layers included in the encoder component 930 and the bottleneck component 940. For example, FIG. 15 illustrates that the encoder component 930 may include a concatenation block 1510, a 2-D convolutional block 1520, and an activation layer (e.g., ReLU) 1530. Thus, the concatenation block 1510 may combine the raw microphone audio data 915 and the directional data 925 by concatenating the directional data 925 to the raw microphone audio data 915 to generate input signals to be processed by the 2-D convolutional block 1520.

The 2-D convolution block 1520 may be configured to perform 2-D convolution with a (C+1, L) kernel, where L=40 indicates that the audio frame includes 40 audio samples or time indexes (e.g., 2.5 ms audio frame), C+1 reflects that there are C input channels from the raw microphone audio data 915 and one input channel from the SDB component 920, and a stride of (L/2, 0) (e.g., 50% overlap between consecutive frames). The 2-D convolution block 1520 may apply a first number of filters (e.g., N=512), and may be followed by the ReLU activation layer 1530 configured to only pass the positive values as the first feature data 935.

While FIG. 15 illustrates example components that may be included in the encoder component 930, the disclosure is not limited thereto. In some examples, the encoder component 930 may include additional 2-D convolutional blocks 1520 not illustrated in FIG. 15 without departing from the disclosure. In other examples, the encoder component 930 may include more complex layers and/or blocks, or a combination thereof, without departing from the disclosure. Additionally or alternatively, the neural sidelobe canceller 1500 may include the C-FF block 960 between the encoder component 930 and the bottleneck component 940 without departing from the disclosure.

The bottleneck component 940 may receive the first feature data 935 and may include a 1×1 (pointwise) convolutional block 1540 configured to reduce the number of channels from the first number of channels (e.g., 512) to the second number of channels (e.g., 128). Thus, the bottleneck component 940 may remap N=512 to B=128 channels, although the disclosure is not limited thereto.

Figure 16:
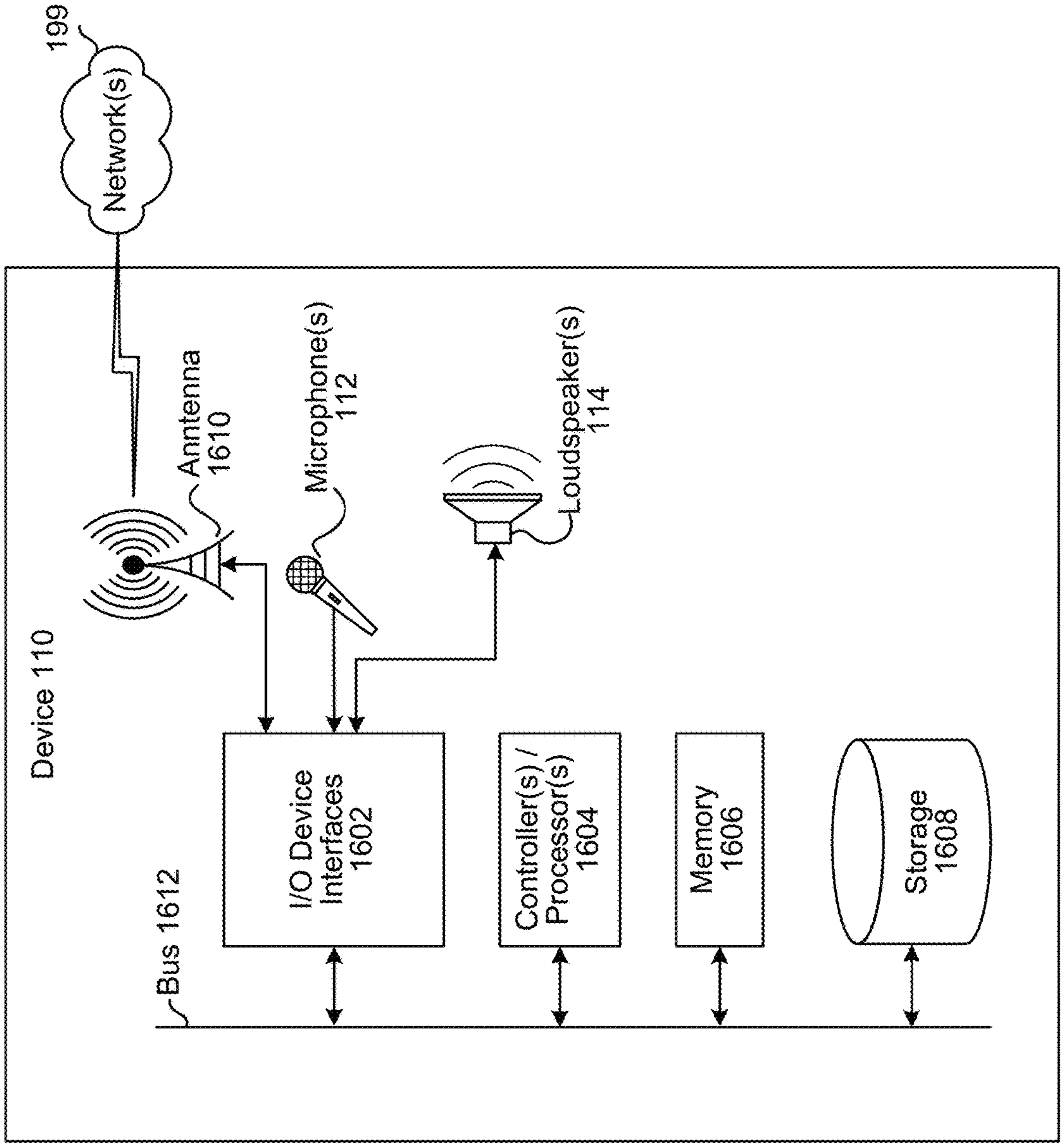
FIG. 16 is a block diagram conceptually illustrating example components of a system for beamforming according to embodiments of the present disclosure.

FIG. 16 is a block diagram conceptually illustrating example components of the system 100. In operation, the system 100 may include computer-readable and computer-executable instructions that reside on the system, as will be discussed further below. The system 100 may include one or more audio capture device(s), such as microphones 112. The audio capture device(s) may be integrated into a single device or may be separate. The system 100 may also include an audio output device for producing sound, such as loudspeaker(s) 114. The audio output device may be integrated into a single device or may be separate. The system 100 may include an address/data bus 1612 for conveying data among components of the system 100. Each component within the system may also be directly connected to other components in addition to (or instead of) being connected to other components across the bus 1612.

The system 100 may include one or more controllers/processors 1604 that may each include a central processing unit (CPU) for processing data and computer-readable instructions, and a memory 1606 for storing data and instructions. The memory 1606 may include volatile random access memory (RAM), non-volatile read only memory (ROM), non-volatile magnetoresistive (MRAM) and/or other types of memory. The system 100 may also include a data storage component 1608, for storing data and controller/processor-executable instructions (e.g., instructions to perform operations discussed herein). The data storage component 1608 may include one or more non-volatile storage types such as magnetic storage, optical storage, solid-state storage, etc. The system 100 may also be connected to removable or external non-volatile memory and/or storage (such as a removable memory card, memory key drive, networked storage, etc.) through the input/output device interfaces 1602.

Computer instructions for operating the system 100 and its various components may be executed by the controller(s)/processor(s) 1604, using the memory 1606 as temporary "working" storage at runtime. The computer instructions may be stored in a non-transitory manner in non-volatile memory 1606, storage 1608, and/or an external device. Alternatively, some or all of the executable instructions may be embedded in hardware or firmware in addition to or instead of software.

The system may include input/output device interfaces 1602. A variety of components may be connected through the input/output device interfaces 1602, such as the loudspeaker(s) 114/202, the microphone(s) 112/204/205/206, and a media source such as a digital media player (not illustrated). The input/output interfaces 1602 may include A/D converters (not shown) and/or D/A converters (not shown).

The input/output device interfaces 1602 may also include an interface for an external peripheral device connection such as universal serial bus (USB), FireWire, Thunderbolt or other connection protocol. The input/output device interfaces 1602 may also include a connection to one or more networks 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network(s) 199, the system 100 may be distributed across a networked environment.

Figure 17:
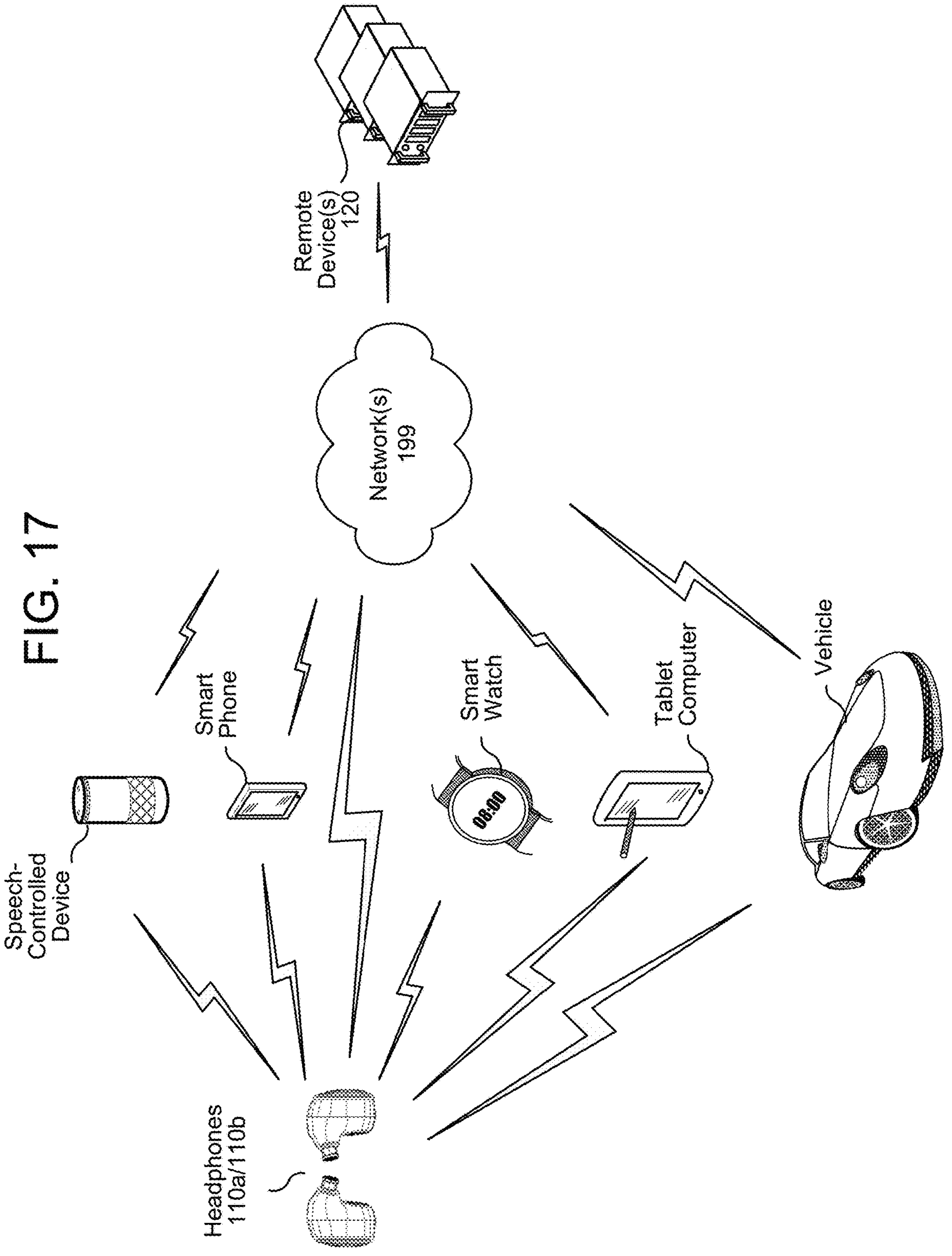
FIG. 17 is a diagram conceptually illustrating example communication between components of a system for beamforming according to embodiments of the present disclosure.

As illustrated in FIGS. 17, multiple devices may contain components of the system 100 and the devices may be connected over network(s) 199. The network(s) 199 may include one or more local-area or private networks and/or a wide-area network, such as the internet. Local devices may be connected to the network(s) 199 through either wired or wireless connections. For example, a speech-controlled device, a tablet computer, a smart phone, a smart watch, and/or a vehicle may be connected to the network(s) 199. One or more remote device(s) 120 may be connected to the network(s) 199 and may communicate with the other devices therethrough. The headphones 110*a*/110*b* may similarly be connected to the remote device(s) 120 either directly or via a network connection to one or more of the local devices. The headphones 110*a*/110*b* may capture audio using one or more microphones or other such audio-capture devices; the headphones 110*a*/110*b* may perform audio processing, voice-activity detection, and/or wakeword detection, and the remove device(s) 120 may perform automatic speech recognition, natural-language processing, or other functions.

Multiple devices may be employed in a single system 100. In such a multi-device system, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system. For example, certain components, such as the beamforming components, may be arranged as illustrated or may be arranged in a different manner, or removed entirely and/or joined with other non-illustrated components.

Figure 18:
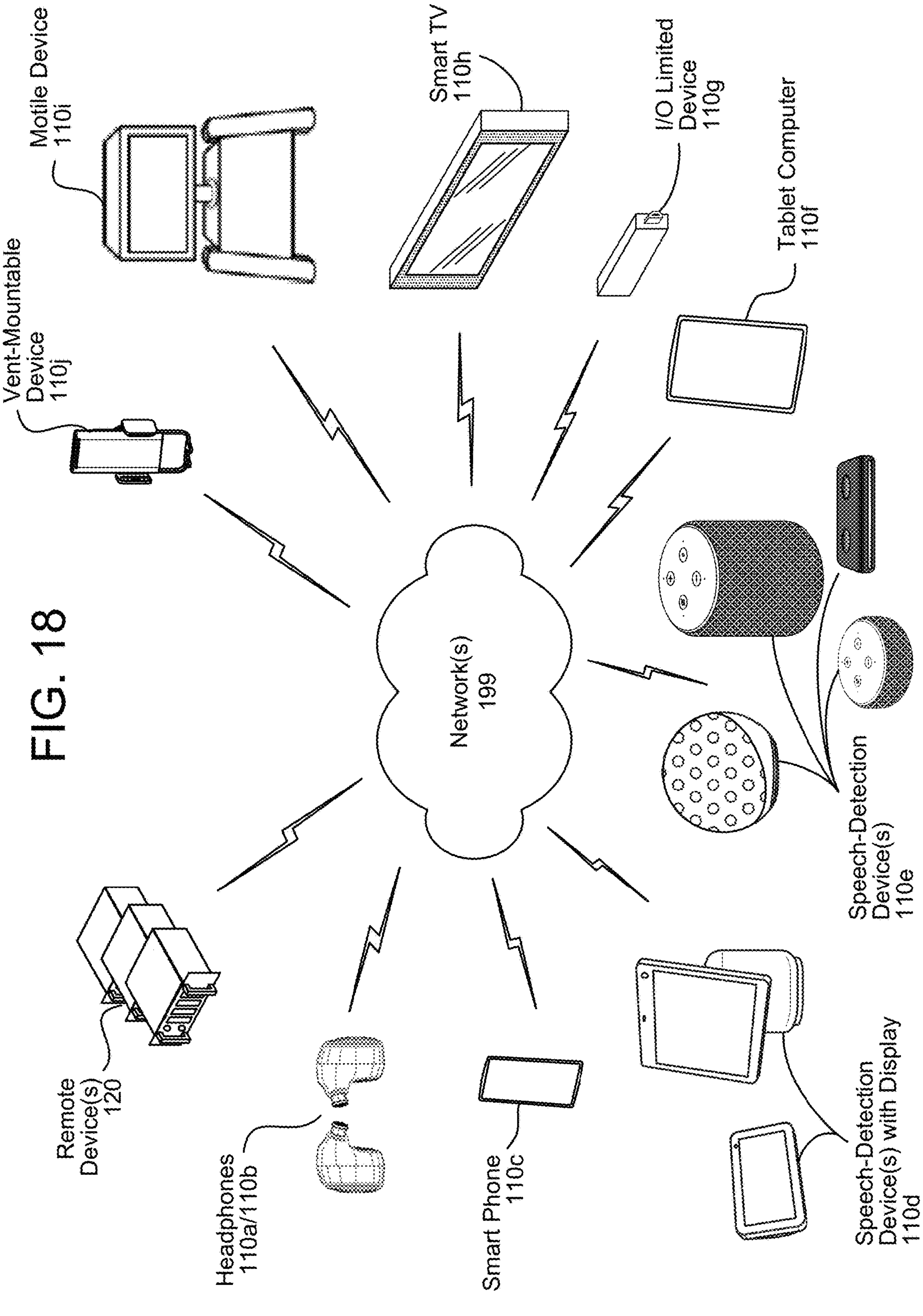
FIG. 18 illustrates an example of a computer network for use with the overall system, according to embodiments of the present disclosure.

As illustrated in FIG. 18, multiple devices (110*a*-110*j*, 120) may contain components of the system and the devices may be connected over a network(s) 199. The network(s) 199 may include a local or private network or may include a wide network such as the Internet. Devices may be connected to the network(s) 199 through either wired or wireless connections. For example, headphones 110*a*/110*b*, a smart phone 110*c*, a speech-detection device with display 110*d*, a speech-detection device 110*e*, a tablet computer 110*f*, an input/output (I/O) limited device 110*g* (e.g., a device such as a FireTV stick or the like), a display/smart television 110*h*, a motile device 110*i*, a vent-mountable device 110*j* (e.g., a device such as an Echo Auto or the like), and/or the like may be connected to the network(s) 199 through a wireless service provider, over a WiFi or cellular network connection, or the like. Other devices are included as network-connected support devices, such as the natural language command processing system associated with remote device(s) 120 and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as an ASR component, an NLU component, etc. of the natural language command processing system associated with the remote device(s) 120.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, components of system may be implemented in firmware and/or hardware, such as an acoustic front end (AFE), which comprises, among other things, analog and/or digital filters (e.g., filters configured as firmware to a digital signal processor (DSP)). Some or all of the beamforming component 802 may, for example, be implemented by a digital signal processor (DSP).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:

receiving first audio data associated with at least two microphones, the first audio data corresponding to a first number of channels and including a first representation of a first speech input and a representation of acoustic noise;

generating, using the first audio data and a first beamformer component configured to emphasize audio from a look direction, second audio data corresponding to a first direction of a plurality of directions;

generating third audio data by concatenating the second audio data with the first audio data, the third audio data corresponding to a second number of channels that is higher than the first number of channels;

generating, using the third audio data, first feature data;

generating, using the first feature data and a first model, mask data indicating portions of the first feature data that correspond to the first speech input, wherein the first model includes a first sequence model and an attention block;

generating, using the first feature data and the mask data, second feature data; and generating, using the second feature data, fourth audio data including a second representation of the first speech input.

2. The computer-implemented method of claim 1, wherein generating the first feature data further comprises:

generating the first feature data by applying a first number of convolutional filters to the third audio data, wherein the first number of convolutional filters is equal to the second number of channels.

3. The computer-implemented method of claim 1, wherein generating the mask data further comprises:

generating, using the first feature data and the first sequence model, third feature data, the first sequence model configured to process a first number of samples of the first feature data; and generating, using the third feature data and the attention block, fourth feature data, the attention block configured to process a second number of samples associated with the first feature data, wherein the second number of samples is smaller than the first number of samples.

4. The computer-implemented method of claim 1, wherein generating the mask data further comprises:

generating, using the first feature data and the first sequence model, third feature data, the first sequence model configured to process a first number of samples of the first feature data;

generating, using the third feature data and a second sequence model, fourth feature data, the second sequence model configured to process the first number of samples of the third feature data; and generating, using the fourth feature data and the attention block, fifth feature data, the attention block configured to process a second number of samples of the fourth feature data, wherein the second number of samples is smaller than the first number of samples.

5. The computer-implemented method of claim 1, wherein generating the mask data further comprises:

generating, using the first feature data and a temporal convolutional network, third feature data; and generating, using the third feature data and the attention block, the mask data, wherein the attention block corresponds to a causal self-attention model.

6. The computer-implemented method of claim 1, wherein generating the second feature data further comprises:

generating, using a first value of the mask data and a first portion of the first feature data, a first portion of the second feature data, the first value indicating that the first portion of the second feature data includes a third representation of the first speech input; and generating, using a second value of the mask data by a second portion of the first feature data, a second portion of the second feature data, the second value indicating that the second portion of the second feature data does not represent the first speech input.

7. The computer-implemented method of claim 1, further comprising:

generating, using the first beamformer component and a portion of the first audio data, fifth audio data corresponding to a second direction different from the first direction;

generating, using the portion of the first audio data and the fifth audio data, third feature data;

generating, using the third feature data and the first model, second mask data indicating portions of the third feature data that correspond to second speech input;

generating, using the third feature data and the second mask data, fourth feature data; and generating, using the fourth feature data, sixth audio data including a representation of the second speech input.

8. The computer-implemented method of claim 1, wherein generating the second audio data further comprises:

receiving input data indicating the first direction;

determining a steering vector corresponding to the first direction; and generating the second audio data using the first audio data, the first beamformer component, and the steering vector.

9. A system comprising:

at least one processor; and memory including instructions operable to be executed by the at least one processor to cause the system to:

receive first audio data associated with at least two microphones, the first audio data corresponding to a first number of channels and including a first representation of a first speech input and a representation of acoustic noise;

generate, using the first audio data and a first beamformer component configured to emphasize audio from a look direction, second audio data corresponding to a first direction of a plurality of directions;

generate third audio data by concatenating the second audio data with the first audio data, the third audio data corresponding to a second number of channels that is higher than the first number of channels;

generate, using the third audio data, first feature data;

generate, using the first feature data and a first model, mask data indicating portions of the first feature data that correspond to the first speech input, wherein the first model includes a first sequence model and an attention block;

generate, using the first feature data and the mask data, second feature data; and generate, using the second feature data, fourth audio data including a second representation of the first speech input.

10. The system of claim 9, wherein the memory further comprises instructions that, when executed by the at least one processor, further cause the system to:

generate the first feature data by applying a first number of convolutional filters to the third audio data, wherein the first number of convolutional filters is equal to the second number of channels.

11. The system of claim 9, wherein the memory further comprises instructions that, when executed by the at least one processor, further cause the system to:

generate, using the first feature data and the first sequence model, third feature data, the first sequence model configured to process a first number of samples of the first feature data; and generate, using the third feature data and the attention block, fourth feature data, the attention block configured to process a second number of samples associated with the first feature data, wherein the second number of samples is smaller than the first number of samples.

12. The system of claim 9, wherein the memory further comprises instructions that, when executed by the at least one processor, further cause the system to:

generate, using the first feature data and a temporal convolutional block, third feature data; and generate, using the third feature data and the attention block, the mask data, wherein the attention block corresponds to a causal self-attention model.

13. The system of claim 9, wherein the memory further comprises instructions that, when executed by the at least one processor, further cause the system to:

generate, using a first value of the mask data and a first portion of the first feature data, a first portion of the second feature data, the first value indicating that the first portion of the second feature data includes a third representation of the first speech input; and generate, using a second value of the mask data by a second portion of the first feature data, a second portion of the second feature data, the second value indicating that the second portion of the second feature data does not represent the first speech input.

14. The system of claim 9, wherein the memory further comprises instructions that, when executed by the at least one processor, further cause the system to:

generate, using the first beamformer component and a portion of the first audio data, fifth audio data corresponding to a second direction different from the first direction;

generate, using the portion of the first audio data and the fifth audio data, third feature data;

generate, using the third feature data and the first model, second mask data indicating portions of the third feature data that correspond to second speech input;

generate, using the third feature data and the second mask data, fourth feature data; and generate, using the fourth feature data, sixth audio data including a representation of the second speech input.

15. The system of claim 9, wherein the memory further comprises instructions that, when executed by the at least one processor, further cause the system to:

receive input data indicating the first direction;

determine a steering vector corresponding to the first direction; and generate the second audio data using the first audio data, the first beamformer component, and the steering vector.

16. A computer-implemented method, the method comprising:

receiving first audio data associated with at least two microphones, the first audio data corresponding to a first number of channels and including a first representation of a first speech input and a representation of a second speech input;

generating, using the first audio data and a first beamformer component configured to emphasize audio from a look direction, second audio data corresponding to a first direction of a plurality of directions;

generating, using the first audio data and the second audio data, first feature data, wherein the first feature data corresponds to a second number of channels that is higher than the first number of channels;

generating, using the first feature data and a first model, mask data indicating portions of the first feature data that correspond to the first speech input, wherein the first model includes a first block configured to perform sequence modeling and a second block that includes a causal attention layer; and generating, using the first feature data and the mask data, third audio data including a second representation of the first speech input.

17. The computer-implemented method of claim 16, wherein generating the first feature data further comprises:

generating third audio data by concatenating the second audio data with the first audio data; and generating the first feature data by applying a first number of convolutional filters to the third audio data, wherein the first number of convolutional filters is equal to the second number of channels.

18. The computer-implemented method of claim 16, wherein generating the mask data further comprises:

generating, using the first feature data and the first block, third feature data, the first block configured to process a first number of samples of the first feature data; and generating, using the third feature data and the second block, fourth feature data, the second block configured to process a second number of samples associated with the first feature data, wherein the second number of samples is smaller than the first number of samples.

19. The computer-implemented method of claim 16, wherein generating the third audio data further comprises:

generating, using a first value of the mask data and a first portion of the first feature data, a first portion of second feature data, the first value indicating that the first portion of the second feature data includes a third representation of the first speech input;

generating, using a second value of the mask data and a second portion of the first feature data, a second portion of the second feature data, the second value indicating that the second portion of the second feature data does not represent the first speech input; and generating, using the second feature data and a decoder component, the third audio data.

20. The computer-implemented method of claim 1, wherein the attention block is configured to perform a query transform and a key transform.

* * * * *